US009085100B2

(12) United States Patent
Foo

(10) Patent No.: US 9,085,100 B2
(45) Date of Patent: *Jul. 21, 2015

(54) PRODUCTION OF ELASTOMERIC FILMS

(75) Inventor: Khon Pu Foo, Selangor (MY)

(73) Assignee: DIPTECH PTE LIMITED, Singapore (SG)

( * ) Notice: Subject to any disclaimer, the term of this patent is extended or adjusted under 35 U.S.C. 154(b) by 269 days.

This patent is subject to a terminal disclaimer.

(21) Appl. No.: 13/147,732

(22) PCT Filed: Feb. 5, 2009

(86) PCT No.: PCT/AU2009/000140
§ 371 (c)(1),
(2), (4) Date: Oct. 18, 2011

(87) PCT Pub. No.: WO2010/088713
PCT Pub. Date: Aug. 12, 2010

(65) Prior Publication Data
US 2012/0028048 A1    Feb. 2, 2012

(51) Int. Cl.
*B28B 1/38* (2006.01)
*B29C 41/14* (2006.01)
*B29C 41/22* (2006.01)
*B29K 21/00* (2006.01)
*B29K 105/00* (2006.01)

(52) U.S. Cl.
CPC .............. *B29C 41/14* (2013.01); *B29C 41/22* (2013.01); *B29K 2021/00* (2013.01); *B29K 2105/0064* (2013.01)

(58) Field of Classification Search
USPC ............ 264/305, 171.24, 174.11, 215, 216, 264/306, 1.7, 642, 510, 527, 241, 297.4, 264/297.5
See application file for complete search history.

(56) References Cited

U.S. PATENT DOCUMENTS

| | | | |
|---|---|---|---|
| 2,321,111 A | 6/1943 | Stamberger | |
| 2,324,735 A | 7/1943 | Spanel | |
| 3,382,138 A | 5/1968 | Barth | |
| 3,942,193 A | 3/1976 | Pugh | |
| 4,070,713 A | 1/1978 | Stockum | |
| 4,082,862 A | 4/1978 | Esemplare | |
| 4,463,156 A | 7/1984 | McGary et al. | |
| 4,696,065 A | 9/1987 | Elenteny | |
| 4,826,721 A | 5/1989 | Obrecht et al. | |
| 5,014,362 A | 5/1991 | Tillotson et al. | |
| 5,326,515 A * | 7/1994 | Sakaki et al. | 264/137 |
| 5,649,326 A | 7/1997 | Richard et al. | |
| 5,702,754 A | 12/1997 | Zhong | |
| 6,019,922 A | 2/2000 | Hassan et al. | |
| 6,143,416 A | 11/2000 | Brindle et al. | |
| 6,280,673 B1 | 8/2001 | Green et al. | |
| 6,345,394 B1 | 2/2002 | Nakamura et al. | |
| 6,347,409 B1 | 2/2002 | Nile et al. | |
| 6,369,154 B1 | 4/2002 | Suddaby | |
| 6,378,137 B1 | 4/2002 | Hassan et al. | |
| 6,391,409 B1 | 5/2002 | Yeh et al. | |
| 6,451,893 B1 | 9/2002 | Tao | |
| 6,527,990 B2 | 3/2003 | Yamashita et al. | |
| 6,566,435 B1 | 5/2003 | Teoh et al. | |
| 6,618,861 B2 | 9/2003 | Saks et al. | |
| 6,638,587 B1 | 10/2003 | Wang et al. | |
| 6,673,871 B2 | 1/2004 | Warneke et al. | |
| 6,706,816 B2 | 3/2004 | Williams et al. | |
| 6,772,443 B2 | 8/2004 | Soerens et al. | |
| 6,775,848 B2 | 8/2004 | McGlothlin et al. | |
| 7,032,251 B2 | 4/2006 | Janssen | |
| 7,037,579 B2 | 5/2006 | Hassan et al. | |
| 7,183,347 B2 | 2/2007 | Ota et al. | |
| 7,374,711 B2 | 5/2008 | McGlothlin et al. | |
| 7,744,645 B2 | 6/2010 | Thornton et al. | |
| 7,771,644 B2 | 8/2010 | Flather et al. | |
| 7,923,498 B2 | 4/2011 | Foo | |
| 8,117,672 B2 | 2/2012 | Lipinski | |
| 8,250,672 B2 | 8/2012 | Lipinski et al. | |

(Continued)

FOREIGN PATENT DOCUMENTS

| | | |
|---|---|---|
| AU | 1998095158 | 6/1999 |
| AU | 2002010112 | 3/2003 |

(Continued)

OTHER PUBLICATIONS

Office Action dated Sep. 19, 2012 for Taiwanese application No. 095125131.
Search Report dated Sep. 18, 2012 for Taiwanese application No. 095125131.
Communication and Extension European Search Report dated Feb. 8, 2013 for EP Patent No. 09839495.0.
9. Stigi et al. "Guidance for Medical Gloves: A Workshop Manual." U.S. Department of Health and Human Services. Revised Sep. 1996.
Japanese Office Action dated Jun. 5, 2012 for patent application No. 2008-522743.
McGlothlin, M. "Accelerator-Free Curing of Dip Molded Latex Films," <www.apexmedtech.com/pdfs/Websitebrochure.pdf> Apex Medical Technologies company document. Accessed Feb. 25, 2015.
Australian Patent Examination Report dated Apr. 8, 2014, for Application 2009339262.

(Continued)

*Primary Examiner* — Stella Yi
(74) *Attorney, Agent, or Firm* — Gardner Groff Greenwald & Villanueva, PC

(57) ABSTRACT

A method for producing multi-layered elastomeric film or article, the method comprising: (i) dipping a mould into a composition for producing an elastomeric film having a total solids content of between 5%-40% to produce a layer of elastomeric film composition on the mould, (ii) partially drying the layer of elastomeric film composition on the mould to reduce the total water content of the elastomeric film composition to a level of not less than 22%, (iii) dipping the mould coated with the partially dried layer of elastomeric film composition into a composition for producing an elastomeric film having a total solids content of between 5%-40% to produce a further layer of elastomeric film composition on the mould, (iv) optionally repeating the partial drying step (ii) and the further dipping step (iii), and (v) drying and curing the layers of elastomeric film composition on the mould.

33 Claims, No Drawings

(56) References Cited

U.S. PATENT DOCUMENTS

| | | |
|---|---|---|
| 8,470,422 B2 | 6/2013 | Lipinski |
| 8,709,573 B2 | 4/2014 | Hassan et al. |
| 2003/0075828 A1 | 4/2003 | Thomas et al. |
| 2003/0118761 A1 | 6/2003 | Triebes et al. |
| 2003/0124354 A1 | 7/2003 | Vistins |
| 2003/0221239 A1 | 12/2003 | Modha et al. |
| 2004/0010067 A1 | 1/2004 | Ota et al. |
| 2004/0071909 A1 | 4/2004 | McGolthlin et al. |
| 2004/0132886 A1 | 7/2004 | Tiao et al. |
| 2004/0176512 A1 | 9/2004 | Tao |
| 2004/0245670 A1 | 12/2004 | Janssen et al. |
| 2005/0031884 A1 | 2/2005 | Koide et al. |
| 2005/0127552 A1 | 6/2005 | Modha et al. |
| 2005/0171272 A1 | 8/2005 | Ota et al. |
| 2006/0218697 A1 | 10/2006 | Modha et al. |
| 2009/0068443 A1 | 3/2009 | Curtet et al. |
| 2009/0272384 A1 | 11/2009 | Lucas et al. |
| 2010/0175164 A1 | 7/2010 | Foo |

FOREIGN PATENT DOCUMENTS

| | | |
|---|---|---|
| CN | 1483058 | 3/2004 |
| CN | 1483958 | 3/2004 |
| EP | 000511681 | 11/1992 |
| EP | 0640623 | 3/1995 |
| EP | 0931633 | 7/1999 |
| EP | 1050280 | 11/2000 |
| EP | 1086980 | 3/2001 |
| EP | 1266927 | 12/2002 |
| EP | 001398131 | 3/2004 |
| EP | 1435374 | 12/2004 |
| EP | 1361247 | 9/2007 |
| EP | 2393650 | 5/2014 |
| GB | 806142 | 12/1958 |
| GB | 876145 | 8/1961 |
| GB | 2434762 | 8/2007 |
| IN | 248073 | 6/2011 |
| JP | 2002514232 | 5/2002 |
| JP | 03138413 | 5/2003 |
| JP | 2003138413 | 5/2003 |
| JP | 2004277471 | 10/2004 |
| MY | 139117 | 8/2009 |
| MY | 141217 | 3/2010 |
| WO | 98006774 | 2/1998 |
| WO | 9924507 | 5/1999 |
| WO | 0009590 | 2/2000 |
| WO | 0021451 | 4/2000 |
| WO | 0047070 | 8/2000 |
| WO | 0238640 | 5/2002 |
| WO | 02068168 | 9/2002 |
| WO | 2004044037 | 5/2004 |
| WO | 05002375 | 1/2005 |
| WO | 2005033229 | 4/2005 |
| WO | 2007/011309 | 1/2007 |
| WO | 2007011309 | 1/2007 |
| WO | 2007105122 | 9/2007 |
| WO | 2007004459 | 11/2007 |

OTHER PUBLICATIONS

Bangladesh Letters Pattent dated May 14, 2013 for patent No. 19/10/2208.
Bangladesh Office Action dated Oct. 25, 2010 for Application No. 19/2010/3923.
Canadian Office Action dated May 13, 2013 for Application No. 2758722.
Chinese Office Action dated Jun. 16, 2014 for Application No. 200980158495.8.
International Preliminary Report on Patentability dated Mar. 26, 2009 for PCT/AU2009/000140.
Malaysia Clear Formalities Report for PCT/AU2009/000140 dated Jan. 17, 2013.
Vietnam Office Action (translation) dated Nov. 24, 2011 for 1-2011-02316.
Vietnam Second Official Notice of Formality Examination Result for 1-2011-02316 dated Mar. 27, 2012.
Written Opinion for PCT/AU2009/000140 dated Mar. 26, 2009.
International Search Report dated Mar. 26, 2009 for international application No. PCT/AU2009/000140.

* cited by examiner

PRODUCTION OF ELASTOMERIC FILMS

FIELD

The present invention relates to methods for producing elastomeric films. The method may be used to produce elastomeric film articles such as gloves.

BACKGROUND

Elastomeric articles such as gloves may be manufactured from natural rubber or synthetic equivalents. The common process of manufacture involves dipping a shaped mould into a tank containing the natural rubber latex or synthetic polymer to form an elastomeric film on the mould.

A single dipping process can produce elastomeric films with a high probability of having or developing defects, such as a weak spots or pin holes. This can cause problems for products such as gloves as the weak spots or pin holes may expose the wearer to infection or chemical permeation depending on the application. Theoretically multiple dipping can be performed to avoid or limit the risk of defects such as these, but the elastomeric films produced are generally thicker, which is undesirable for products such as gloves due to the reduced sensitivity to the wearer. Another problem associated with multiple dipping methods is that there can be poor adhesion between the individual layers of elastomeric film, which increases the risk of pin-hole/barrier defects and may reduce the durability of the elastomeric film due to delamination between the individual layers. A further problem can be poor pick-up of the latex composition onto the pre-dipped layer on the mould.

There is a need to develop an improved method for producing multilayer elastomeric film products, such as gloves, which results in the production of products with improved qualities.

It is desirable for the process to be capable of application to a wide range of polymeric compositions for forming elastomeric films. In some instances, it is desirable for the product to be free of chemical irritants, including accelerators in particular. When accelerators are not used, the process needs to be capable of forming elastomeric films and articles which still have the required properties of the desired thickness, good coating of film layers onto underlying layers, minimisation of pin-hole defects, mechanical strength, durability and/or freedom from delamination between individual layers.

SUMMARY

According to the present application there is provided a method for producing multi-layered elastomeric film or article, the method comprising:
(i) dipping a mould into a composition for producing an elastomeric film having a total solids content of between 5%-40% to produce a layer of elastomeric film composition on the mould,
(ii) partially drying the layer of elastomeric film composition on the mould to reduce the total water content of the elastomeric film composition to a level of not less than 22%,
(iii) dipping the mould coated with the partially dried layer of elastomeric film composition into a composition for producing an elastomeric film having a total solids content of between 5%-40% to produce a further layer of elastomeric film composition on the mould,
(iv) optionally repeating the partial drying step (ii) and the further dipping step (iii), and
(v) drying and curing the layers of elastomeric film composition on the mould.

The elastomeric film or article may be in the form of a glove, condom, balloon or another product. When the elastomeric article is a glove, the mould is suitably a glove or hand-shaped mould.

The present application also provides elastomeric films and articles, such as gloves, condoms or balloons, produced by the method.

The method may further comprise the steps of:
(a) dipping the mould into a coagulant containing multivalent ions in solution,
(b) drying or partially drying the coagulant-dipped mould, prior to step (i).

Typically, during the partial drying step (ii), the maximum film surface temperature of the elastomeric film composition on the mould is between 25° C.-85° C.

It has been found by the applicant that it is very important to only partially dry each layer of elastomeric film composition on the mould prior to applying a subsequent layer of elastomeric film composition. In particular, the applicant has found that it is important that the water content in the partially dried elastomeric film composition on the mould is no less than 22% when the mould is dipped again to form a further layer. The water content of not less than 22% reflects that some liquid remains in the layer of elastomeric film composition. This water content enables subsequent layers of elastomeric film composition to be applied and to adhere, spread evenly across and penetrate into the underlying layer, to assist in the avoidance of pin-point or barrier defects and de-laminating in the film. This also assists in the durability of the film. Previously, it was considered necessary to completely dry each layer of elastomeric film composition when preparing a multilayered elastomeric film. However, this is not the case, and surprisingly improved properties flow from partially drying the elastomeric film composition under the conditions referred to in step (ii) prior to the application of subsequent layers of elastomeric film composition.

The dipping is performed at least twice, with the intermediate partial drying step as described above. As indicated in step (iv), steps (ii) and (iii) can optionally be repeated one or more times, to produce films and articles comprising 3 or more layers. The final elastomeric film or article can, for example, comprise 2 to 15 layers, preferably 2 to 10 layers, more preferably 3 to 6 layers of composition.

DETAILED DESCRIPTION

The method for producing multi-layered elastomeric film or articles is suitable for manufacturing polymer gloves, including "disposable gloves". Conventionally, polymer gloves are used to avoid contamination, i.e. in food handling or in hospitals where there is a risk of transfer of infection on contact with sites of infection. Polymer gloves are also used to avoid the transfer of disease via skin contact between patient and examiner, when physical examination is carried out.

Disposable gloves are usually thinner than non-disposable gloves, where the reduced cost of manufacture of a thinner glove means it is cost-effective to dispose of the glove after a single or several uses. Longer-lasting gloves tend to be thicker, for greater durability and lifespan. Both disposable and longer-lasting gloves can be produced using the method of the present application.

The physical properties of disposable gloves, usually include a snug tight fit of a thin elastomeric film to facilitate sensitivity to touch by the wearer. At the same time, sufficient elongation is required to ensure the glove can be stretched to facilitate insertion of the wearer's hand into the glove with relative ease and without damage to the glove. Other important properties are minimizing from barrier defects such as pin-holes.

The method of the invention may also be used to form other elastomeric articles such as condoms and balloons.

Composition

The composition for producing an elastomeric film suitably comprises a dispersion or emulsion of an elastomer-forming polymer in a liquid. The composition generally comprises an elastomer-forming polymer and a cross-linking agent in a liquid medium. The liquid medium is typically water, although other solvents can be used. An emulsifier and other optional components, as described in further detail below, may also be present in the composition.

The total solids content of the composition for forming the elastomeric film is between 5-40% by weight of the composition. The percentage of total solids content (TSC %) can vary within this range. The solids are diluted with liquid (such as water) to reach the desired concentration. Generally, for forming a thin or disposable type of glove, the total solids content will be towards the lower end of this range—and within one of the following ranges: 2-30%, 4-30%, 4-20%, 5-20%. For forming thicker gloves, the total solids content will tend to be higher, or the glove will be produced from many more layers. Thus, for thicker gloves, the total solids content will tend to be within one of the following ranges: 4-40%, 5-40%, 5-30%, 5-20%, 10-40%, 10-30%, 15-40%, 15-30%.

Elastomer-Forming Polymers

Elastomer-forming polymers include natural rubber and synthetic elastomer-forming polymers, which can be cross-linked to produce elastomeric films. The polymer may be a single polymer or a combination of two or more polymers. The polymer may be a homopolymer or a co-polymer.

The synthetic elastomer-forming polymer may be a polymer containing free ionically cross-linkable groups, covalently cross-linkable groups, or a combination of both. Examples of ionically cross-linkable groups are acids, including carboxylates, sulfonates and acid anhydrides, and an example of a covalently cross-linkable group is a double bond.

Synthetic elastomer-forming polymers include copolymers produced by copolymerisation of conjugated diene monomers and ethylenically unsaturated acid monomers (carboxylated polyacrylonitrile butadiene being an example of such a copolymer), polyisoprene, polychloroprene and/or polyurethane. Amongst the range of conjugated diene monomers, examples are 1,3-butadiene, iso-prene, 2,3-dimethyl-1,3-butadiene, 2-ethyl-1,3-butadiene, 1,3-pentadiene, chloroprene and acrylonitrile. Regarding ethylenically unsaturated acid monomers, the acid group may be a carboxyl group, a sulfonic acid group or an acid anhydride group. Examples of ethylenically unsaturated acid monomers include acrylic acid or methacrylic acid; itaconic acid, maleic acid, fumaric acid, maleic anhydride, citraconic anhydride, sytrenesulfonic acid, monobutyl fumarate, monobutyl maleate, mono-2-hydroxypropyl maleate, and alkali metal or ammonium salts thereof.

One notable example of a synthetic elastomer-forming polymer is carboxylated polyacryonitrile butadiene. This may be provided as a mixture of carboxylated nitrile latex and nitrile butadiene rubber.

In the art of the present invention, it is common to refer to the amount of the elastomer-forming polymer as being 100 phr (per hundred parts "rubber"), and for the relative amounts of the remaining components of a composition for producing an elastomeric film to be calculated as a number of parts compared to the 100 phr of the elastomer-forming polymer, by weight. Thus, for an amount of cross-linking agent that is $1/100^{th}$ that of the elastomer-forming polymer in the composition by weight, the amount of cross-linking agent is referred to as 1.0 phr.

It is also common in the art to use the expression "latex" or "rubber" to refer to any elastomer-forming polymer in a general sense. Accordingly, particularly in the examples which follow, it should be understood that these terms have been used as short-hand to refer to the polymer of the dipping composition.

Cross-Linking Agents

Elastomer-forming polymers can be cross-linked with one or more cross-linking agents to produce the elastomeric film. Various types of cross-linking agents can be used.

Accelerators are one sub-class of cross-linking agents which release sulphur, or act with sulphur-containing compounds, to accelerate sulphur-based covalent cross-linking of the elastomer-forming polymer. Generally, accelerators can be advantageous as they shorten the curing (vulcanisation) time, lower the curing temperature or decrease the amount of cross-linking agents required to be used in the composition. However, on the negative side, accelerators can give rise to allergic reactions, such as allergic contact dermatitis with symptoms including erythema, vesicles, papules, pruritus, blisters and/or crusting. Examples of accelerators include the carbamates (eg. zinc dibutyl dithiocarbamate); thiurams (eg. tetraethylthiuram disulfide(TMTD) and diphenylthiourea); thiazoles (eg zinc 2-mercaptobenzothiazole (ZMBT)); guanidines (eg. diphenylguanidine) and aldehyde/amine-based accelerators (eg. hexamethylenetetramine). Other examples are well known in the art and can be obtained from various publicly available sources.

Another class of cross-linking agents are the ionic cross-linking agents, which include metal oxides and peroxides (organic and inorganic). These work by ionically cross-linking ionically-crosslinkable groups in the elastomer-forming polymer. For example, when the elastomer-forming polymer is carboxylated polyacrylonitrile butadiene, a metal oxide cross-linker works by ionically cross-linking the carboxylic acid groups. Examples of suitable metal oxide cross-linking agents include the divalent metal oxide cross-linking agents, such as lead oxide, magnesium oxide, barium oxide, zinc oxide and mixtures thereof. An example of a peroxide cross-linking agent is 1,1-di(t-butylperoxy)-3,3,5-trimethylcyclohexane, which can be purchased under the trade name Trigonox 29-40B-pd. Combinations of these cross-linking agents can also be used.

A further class of cross-linking agents are the covalent cross-linking agents, which include sulphur and sulphur-containing vulcanising agents. These work by covalently cross-linking unsaturated double bonds present in the elastomer-forming polymer. The sulphur can be present in the form of elemental sulphur. The sulphur can also be donated by organic sulphuric compounds, for example TMTD (Tetramethylthiuram Disulfide). Sulphur donors such as this one are likely to contribute to chemical allergies and it is preferred to keep their use to a minimum in the manufacture of gloves when allergic content is an issue. Thus, if used, the sulphur is preferably present in the form of elemental sulphur.

Generally, the amount of cross-linking determines the elasticity of the elastomeric film. Therefore, the amount and type of cross-linking agent will contribute to the extent of cross-linking and the elasticity of the final elastomeric film.

For ionic cross-linking agents such as metal oxide and peroxide cross-linking agents, when used, the amount is preferably in the range 0.2-8.0 phr. The amount of metal oxide cross-linking agent is suitably within one of the following ranges: 0.2-5.0 phr, 0.2-4.0 phr, 0.2-1.5 phr, 1.0-4.5 phr, 0.5-1.5 phr, 0.8-1.6 phr, 0.8-1.2 phr or 1.5-5.0 phr.

In some embodiments the composition for producing an elastomeric film is free of sulphur. In other embodiments, the cross-linking agent comprises sulphur. Sulfur requires high energy at curing (thus high curing temperature and/or time) compared to other cross-linking agents. However, sulphur does provide the glove with greater chemical resistance, and therefore it may be desired for this reason. The amount of sulphur in the composition may be in the range of 0-5.0 phr, and when present, from 0.01 to 5.0 phr, 0.01-3.5 phr, 0.01-3.0 phr 0.01-2.0 phr or 0.01-1.0 phr or 0.01-0.5 phr for accelerator-free compositions. When the composition also includes accelerator, the amount of sulphur is suitably between 0.0-3.5 phr, such as 0.01-3.0 phr, 0.01-2.0 phr, 0.01-1.5 phr, 0.01-1.0 phr or 0.01-0.5 phr.

According to one embodiment, the composition for producing the elastomeric film is accelerator-free.

According to another embodiment, the composition comprises an accelerator. When an accelerator is present, the composition may be free of other cross-linking agents. The amount of accelerator is suitably between 0.1-2.0 phr, such as between 0.1-1.5 phr, 0.1-1.0 phr, 0.2-1.0 phr, 0.3-2.0 phr, 0.3-1.5 phr or 0.2-0.6 phr.

Preparation of the Composition

The composition for producing an elastomeric film can be prepared by mixing the elastomer-forming polymer with a cross-linking agent, and optionally one or more additives, in a liquid (eg. water).

Suitable additives that may be included in the composition can include one or more additives selected from the group consisting of stabilisers, emulsifiers, antioxidants, vulcanising agents, polymerisation initiators, pigments, fillers, colourising agents and sensitisers.

The preparation of the composition includes steps known in the art, and the composition can be prepared in a conventional manner. For example, the elastomer-forming polymer can be diluted with a solution of a stabilizer, such as potassium hydroxide, ammonium hydroxide and/or sodium hydroxide. The amount of stabiliser used is dependent on the synthetic polymer employed, the pH of the composition and other factors. The stabiliser can range from 0.1-5.0 phr, e.g. 0.5 to 2 phr, preferably 1.0 to 1.5 phr, which is diluted with water, preferably filtered water.

A diluted stabilizer solution can be mixed with the elastomer-forming polymer. The pH of the mixture is suitably adjusted to between 8.5 to 10.5, such as a pH between 9.0 to 10.0. The cross-linking agent(s) can then be added to the mixture.

Antioxidants, for example Wingstal L (the product of p-cresol and dicyclopentadiene) may be added. The antioxidant may, for example, be added in an amount ranging from 0.1-5.0 phr, 0.1-3.0 phr, 0.1-1.0 phr or 0.3-0.5 phr. Pigments such as titanium dioxide, selected for its pigmentation, to reduce the transparency of the final elastomeric film, may be added in amounts ranging from 0.01-10.0 phr, such as 1.5-2.0 phr and colourants can also be added in the desired amounts. The mixture is then diluted to the target total solids concentration within the range of 5%-40% (or within any narrower range as described previously) by the addition of a liquid, such as water.

Sensitisers are chemicals that can be used in compositions for producing elastomeric films to control the amount of the composition that will remain coated on the mould during dipping. Examples of sensitisers known in the art that can be used in the composition for producing an elastomeric film include polyvinyl methylether, polypropylene glycol, ammonium nitrate and ammonium chloride. When used, the amount of sensitiser will be chosen based on the desired film thickness to remain on the mould during dipping, and will generally be between 0.01-5.0 phr. For thinner films, the amount will generally be between 0.01 to 2.0 phr, e.g. 0.1 to 1.0 phr. When other techniques are used for controlling the film thickness on the mould, such as the use of pre-dipping the mould into coagulant before undertaking the multiple dipping into the composition for producing the elastomeric film, the composition for producing an elastomeric film may not comprise a sensitiser.

Production of Elastomeric Film

The manufacture of the elastomeric film may use conventional equipment.

Optional Step (a) Dipping the Mould into a Coagulant Containing Multivalent Ions in Solution A suitable mould, which is based on the shape of the article to be produced (eg. flat for a film or glove-shaped for a glove) can be dipped into a coagulant containing multivalent ions in solution. The dipping of the mould into a coagulant containing multivalent ions leaves on the surface of the mould a thin coating of the charged ions. The charged ions coating can assist in controlling the amount composition for forming the elastomeric film that will subsequently remain on the surface of the mould after dipping into the composition, through charge interactions.

The multivalent ions may be cationic (as in the case of, for example, calcium ion-containing coagulants) or anionic, and the choice will be based on the identity of the elastomeric polymer.

Generally multivalent metal ion solutions containing multivalent cations are suited to a broad range of elastomeric polymers. Examples of such multivalent metal salt ions are calcium, magnesium, barium, zinc, and aluminium. The counterions may be halides (such as chloride), nitrate, acetate or sulphate, amongst others. In the case of calcium ion-containing coagulants, the calcium ions can be provided as a solution of calcium nitrate or calcium chloride.

The coagulant may also include any other agents, such as wetting agents, anti-tack agents and/or mould release agents, such as silicon emulsions, polymer release agents and metallic stearates, examples of which are zinc and calcium stearates.

The concentration of multivalent ions can broadly be in the range of 1.0-50% by weight of the coagulant solution (measured as the compound of the multivalent ion in the solution of the multivalent ions), depending on the desired thickness of the elastomeric film layers and the number of layers to be applied. In the case of thinner layers, the concentration is suitably in the range of 1.0-20%, 1.0-15%, 1.0-12%, 1.5-20%, 1.5-15%, 1.0-10%, 1.5-10%, 4-10%, 5-10%, 5-35%, 7-40%, 8-50% and 5-45%. The amounts of other components such as wetness and anti-tack agents are dependent on the properties desired through the use of these agents, and will vary accordingly.

The duration or dwell time for the mould in the coagulant is suitably between 1 and 30 seconds. In some embodiments, the dwell time for the mould in the coagulant is 1 to 10 seconds. In some embodiments, the dwell time for the mould in the coagulant may be longer than 30 seconds. The temperature of the coagulant into which the mould is dipped may, for example, be between 30° C.-80° C.

Prior to dipping the mould into the coagulant, the mould may be subjected to heating. The heating may form a part of a preliminary mould washing and drying procedure. The mould may in this case be heated to a surface temperature in the range of 25° C. to 85° C., for example a temperature in the range of 30° C. to 70° C.

Optional Step (b) Drying or Partially Drying the Coagulant-Dipped Mould

If the mould is dipped into a coagulant, following this step the mould is dried or partially dried.

Drying (or partial drying) is a step that may be repeated in several stages during the production of the multi-layered elastomeric film or article. At each drying or partial drying step, the drying may be performed by any suitable technique or equipment known in the art, including the application of hot air or radiant heat, or a drying radiation source such as infra red (IR) and far IR radiation. This can be performed in an oven or any other suitable drying equipment or environment. In the case of drying in an oven, or under the influence of hot air or radiant heat, the mould may be passed through the drying zone, which applies heat at an elevated temperature, for a period of time that is sufficient to drive off the excess moisture/liquid to a sufficient degree of dryness. In the case of drying the coagulant remaining on the mould, the drying zone (such as oven) may for example be held at, or apply, heat at a temperature of between 50° C.-250° C. The mould typically remains in this zone (or progresses through this zone) for a period of time sufficient to reach the target level of drying, and optionally a target surface temperature of the coagulant on the mould. This may be between 25° C.-85° C., for example between 40° C.-70° C.

The surface temperature of a coating on the mould (in this case, the coagulant) can be tested by any suitable technique. One example involves the use of a device to measure the surface temperature of an object by the infra red energy emitted by the object. An example of a device of this type is the Thermo-Hunter, model: PT-2LD produced by Optex Co. Ltd. Other techniques for measuring the surface temperature of the film are known in the art.

Step (i) Dipping the Mould into a Composition for Producing an Elastomeric Film Having a Total Solids Content of Between 5-40% to Produce a Layer of Elastomeric Film Composition on the Mould The mould is dipped into the composition for producing an elastomeric film, embodiments of which have been described in detail above.

The mould is in the dipping tank for an amount of time to ensure the mould is evenly coated, but not so long as to develop a thicker coating than necessary. Depending on the required thickness of the coating, the dwell time of the mould in the dipping tank may be between 1-30 seconds, such as between 2.0 to 7.0 seconds.

The temperature of the composition into which the mould is dipped is generally within the range of 10° C. to 60° C., such as 10° C. to 50° C., 15° C. to 50° C., 20° C. to 50° C., 25° C. to 50° C. or 25° C. to 45° C.

Preferably, the surface temperature of the mould does not exceed the temperature of the composition for producing an elastomeric film by more than 80° C. It has been found by the applicant that if the surface temperature of the mould is more than 80° C. higher than the temperature of the composition for producing an elastomeric film, shrinkage of the coating of elastomeric film composition on the mould may occur. In some embodiments, the surface temperature of the mould is lower than the temperature of the composition for producing an elastomeric film. However, typically, the surface temperature of the mould is about 20° C. to 60° C. higher than the temperature of the composition for producing an elastomeric film.

Step (ii) Partially Drying the Layer of Elastomeric Film composition on the Mould The coating or layer of elastomeric film composition on the mould is then partially dried, as opposed to fully dried, to reduce the water content but without the water content lowering to such an extent that it falls below 22%. The partially dried elastomeric film composition has a water content in excess of 22% by weight which reflects that some moisture remains in the elastomeric film composition layer on the mould. Typically, the elastomeric film composition on the mould is dried to a moisture content between 22% and 80%, for example, to 25% to 75% or 30% to 77% or 25% to 60%.

If the elastomeric film composition on the mould is dried to a water content of less than about 22%, the layer of the elastomeric film on the mould appears visibly dry and when dipped in a composition for forming an elastomeric film having a total solids content of between 5 to 40%, the composition does not readily adhere to the surface of the dried layer of elastomeric film composition on the mould. A flow mark also becomes visible, and the final product displays shrinkage and/or weak spots. The coating may also be uneven.

The partial drying may be conducted using the same type of drying technique as described above in relation to step (b), using conditions necessary to reach a state of partial dryness.

The partial drying may be performed by any suitable technique or equipment known in the art, including the application of hot air or radiant heat, or a drying radiation source such as infra red (IR) and far IR radiation. This can be performed in an oven or any other suitable drying equipment or environment.

In the case of partial drying in an oven, or under the influence of hot air or radiant heat, the mould bearing the layer or coating of elastomeric film composition may be passed through the drying zone, which applies heat at an elevated temperature, for a period of time that is sufficient to drive off some of the excess moisture/liquid to a sufficient degree of partial dryness. In this case, the drying zone (such as oven) may be held at, or apply, heat at a temperature of between 50° C.-300° C. (depending on the drying time). This time period may be between 2-300 seconds (depending on the temperature of the oven). Generally, the higher the oven temperature, the shorter the time period in the drying zone, and vice versa.

Generally, during the partial drying, the mould remains in the drying zone (or progresses through this zone) for a period of time sufficient to raise the surface temperature of the layer of elastomeric film composition on the mould to a maximum temperature between 25° C. and 85° C., e.g. 40° C. to 80° C. If a higher surface temperature is reached, excessive or uneven drying may occur. In addition, the elastomeric film composition on the mould may require cooling prior to the next dipping step. An additional cooling step may result in delays or additional costs in the manufacture of the elastomeric film or article.

The surface temperature of the elastomeric film composition on the mould can be measured using the same techniques described above with respect to the coagulant layer surface temperature.

The partial drying is required to reduce the water content of the elastomeric film composition on the mould. The water content of the partially dried elastomeric film composition is greater than 22%. The water content of the elastomeric film composition on the mould can be determined by measuring the mass of a sample product at the point of completion of the partial drying step, and then driving off the remaining moisture/liquid in the sample product to obtain the dry mass of the product, and determining from these two values the total water content. Thus, if the single-layered product at this point in time weighs 100 mg, and the dried product weighs 90 mg, the water content is 10%.

Step (iii) Dipping the Mould Coated with the Partially Dried Layer of Elastomeric Film Composition into a Composition for Producing an Elastomeric Film Having a Total Solids Content of Between 5%-40% to Produce a Further Layer of Elastomeric Film Composition on the Mould The mould coated with the partially dried layer of elastomeric film composition is dipped into a composition for producing an elastomeric film. The composition into which the mould is dipped can be the same as or different to the composition used to form the first layer. The composition may differ with respect to the identity and/or amount of the elastomer-forming polymer, the identity and/or amount of any cross-linking agent, the identity and/or amount of other additives, and the total solids content. In some embodiments, the identity of the elastomer-forming polymer in the second composition is the same as that used in the first composition. In such embodiments, the amount of the cross-linking agent is also typically the same. In other embodiments, the identity of the elastomer-forming polymer of the second composition is different to that in the first composition. The total solids content of the second composition may be the same or different to that of the first composition. The total solids content will depend in part on the desired thickness of the second (or further) layer being applied.

The dwell time of the mould in the second composition is, for example, between 1 and 30 seconds, such as 1 and 20 seconds, 1 and 10 seconds, such as 2 to 5 seconds.

The temperature of the composition into which the mould is dipped is generally within the range of 10° C. to 60° C., such as 10° C. to 50° C., 15° C. to 50° C., 20° C. to 50° C., 25° C. to 50° C. or 25° C. to 45° C.

Preferably, the surface temperature of the partially dried layer of elastomeric film composition on the mould does not exceed the temperature of the composition for forming an elastomeric film by more than about 80° C. It has been found by the applicant that if the surface temperature is more than about 80° C. higher than the temperature of the composition for forming an elastomeric film, shrinkage of the elastomeric film composition on the mould may occur. In some embodiments, the surface temperature is lower than the temperature of the composition for forming an elastomeric film. However, typically, the surface temperature is about 20° C. to 60° C. higher than the temperature of the composition for forming an elastomeric film.

Step (iv) Optionally Repeating the Partial Drying Step (ii) and the Further Dipping Step (iii)

The partial drying step and further dipping steps may be repeated. These steps are suitably repeated at least once, and may be repeated multiple times. For each repeated step, the conditions may be different compared to the original partial drying conditions and dipping conditions for producing the second layer. Thus, as an example, extent of partial drying, the total solids content of the composition for forming an elastomeric film may differ for each layer.

For each partial drying step, the layer of elastomeric film composition in the mould is partially dried to reduce the water content of the elastomeric film composition such that water content of the partially dried layer of elastomeric film on the mould has a water content of greater than 22%. This water content is measured by reference to the water content of the entire elastomeric film layer on the mould (that is, the elastomeric film layer formed by multiple dipping).

The average thickness of each layer is typically between 6% and 90% of the final elastomeric film, with some layers (such as the first layer) suitably being between 30 to 70%, or 40 to 65% of the full film thickness. The average thickness of each layer is dependent on the number of layers of composition forming the final elastomeric film. The final elastomeric film can, for example, consist of 2 to 15 layers, such as 2 to 10 layers, 2 to 6 layers, or 3 to 6 layers.

Generally, although not always, the greater the number of layers in the film, the lower the % TSC of the composition for producing each subsequent layer. This is to keep the thickness of the multilayer film to a minimum. After the first layer, the % TSC of the composition used to produce each subsequent layer may be in the range 5%-40% TSC, such as 5-30% or 5-12% or 10-30% or 10-40% or 10-20%.

Each layer can be of approximately equal thickness, or of differing thickness. For example the $1^{st}$ layer can be 50%, 2nd layer 30%, 3rd layer 20% for a 3-layer film. Approximately equal thickness can be achieved by varying the total solids content of the composition of each layer and the temperature at which the layer is deposited. Different mechanisms of deposition can occur for each layer and different thicknesses can be deposited even if the % TSC is maintained at the same level. Accordingly, varying the % TSC is sometimes required to maintain the same level of thickness. The thickness of the deposited layers can also vary according to the concentration of multivalent ions in the coagulant solution, or the amount of any sensitiser present in the composition for producing the elastomeric film temperature of the composition, and dwelling time of the mould into the composition.

Optional Additional Steps Prior to Drying and Curing

Further steps can be taken to fine-tune the manufacture of the elastomeric film or article. The film or article can be leached to remove extractable components. Suitable conditions for leaching extractable components from the film or article can involve contacting the film or article with heated water (eg. through immersion) at a temperature between 40 to 60° C. for between 1 to 50 mins. During this leaching process, a substantial amount of soluble and extractable components (such as surfactant, ionic compounds) can be removed.

In the case of glove manufacture, the glove can be subjected to beading/cuffing to create a bead or cuff at the wrist end of the glove.

Step (v) Drying and Curing the Layered Elastomeric Film on the Mould

The film or article is then dried and cured. This step can be effected in an oven with a minimum temperature of 80° C., in the range 80-150° C., or a minimum temperature of 90° C. (such as 90-150° C.) at a minimum time of 10 minutes, in the range 10-40 mins. Other drying and curing techniques that can be used includes UV curing.

Optional Additional Steps Following Drying and Curing

The film or article can be subjected to one or more further process steps prior to stripping of the film or article from the mould. These optional steps include cooling, chlorination, post-curing rinsing, polymer coating and additional drying steps.

The film or article is stripped from the mould at the conclusion of the formation process.

Elastomeric Film Features

The thickness of the final film (or article) can, for example, be in the range 0.01-3.0 mm, such as 0.01-0.3 mm, 0.02-0.2 mm, 0.05-0.10 mm, 0.03-0.08 mm, or 0.05-0.08 mm (for thin or disposable gloves), and 0.2-3.0 mm for thick gloves. The thickness is suitably measured as an "average thickness", particularly for gloves, using the points of measurement described below.

The film properties can be measured according to ASTM D-412. In one embodiment in which the thickness (average thickness) of the film is measured at 0.03-0.10 mm, the physical features of the film are suitably: minimum tensile strength of 10.0 Mpa, relatively low in modulus at 300% of less than 10.0 Mpa and minimum elongation of 500%. In another embodiment in which the thickness (average thickness) of the film is measured at 0.03-0.10 mm, the physical features of the film are suitably minimum tensile strength of 14.0 Mpa, relatively low in modulus at 300% of less than 5.0 Mpa and minimum elongation of 500%.

The desired durability of the film is determined by the end use of the article. For example, for gloves for non-surgical use, the wearing time is usually below 3 hrs, and commonly less than 2 hrs. The durability of the film can be controlled by the curing conditions. Generally, the higher the curing temperature, the more durable the elastomeric film.

The term "average thickness" in respect of the thickness of a glove (specifically the multi-layer elastomeric film forming the glove) refers to the average of three thickness measurements, taken at points along the layer of the elastomeric film. The measurements are taken at the cuff, the palm and the finger tip. When measuring the thickness of individual layers of the glove, the "average thickness" is a reference to the average thickness of that layer of film, taken at the three measurement points. This may be measured in absolute terms (in mm), or as a percentage of the full thickness of the multi-layered glove. For elastomeric articles, a similar technique using three thickness measurements can be used to determine the "average thickness".

The method described above can be used to produce a multilayered elastomeric film or article with reduced potential for defects such as pin holes, weak spots and/or delamination compared to prior art processes for producing multilayered elastomeric films in which each layer is fully dried prior to applying a subsequent layer. Further, the method can be used to produce stronger multi-layered elastomeric films than some prior art processes. For thin gloves, of the type used for disposable applications, the method can be carried out using a film-forming composition having a very low concentration of solids, and other factors, which assist to keep each coating layer thin. Accordingly, the overall thickness is kept to a minimum. At the same time, the partial drying step performed between the application of each layer of film-forming composition aids to ensure good lamination, or adhesion and coverage, between adjacent layers. Without this step, difficulties are faced in trying to obtain a multi-layer film having the desired properties.

In the claims and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

EXAMPLES

The invention will now be described in further detail with reference to the following non-limiting examples. All tables of compositions and test results are shown in the Tables section. All testing procedures are shown in the Testing Procedures section.

General Procedures

In the examples set out below, the following general procedure was utilised to produce elastomeric films, and gloves in particular. The general procedure was also used to demonstrate the impact (if any) that certain processing conditions and components of the elastomeric film forming compositions have on the quality of multilayer elastomeric films produced.

General Procedure 1.

1.1 Washing

The mould is subjected to pre-washing, so as to be clean of any remaining residues following removal of a glove made on the mould previously. The mould is then dried in an oven at 70° C., reaching a surface temperature of around 60° C. (50° C.-63° C.).

1.2 Coagulant Dipping

The mould is dipped in the coagulant in accordance with the following parameters:

| | Operating Parameter | | | |
|---|---|---|---|---|
| Tank | Temperature (° C.) | Dwell Time (second) | $Ca(NO_3)_2$ (% in water) | pH |
| Coagulant Dipping Tank | See example details - generally 53-62° C. | 2 | See example details | See example details |

1.3 Oven Drying

The mould is dried in accordance with the following parameters:

| | Operating Parameter | |
|---|---|---|
| Oven | Temperature (° C.) | Time (second) |
| Coagulant Oven Blower | 135 | 38 |

1.4 Pre-Condition 1

The oven drying as described in step 1.3 is used to obtain certain "preconditions" for the coating on the mould, prior to proceeding to the next step. Pre-condition 1 refers to the conditions of surface temperature and "dryness" of the mould coated with coagulant achieved following oven drying, prior to continuing to the next step. In some examples, pre-condition 1 is manipulated to demonstrate the impact that pre-condition 1 has on the final product. Where the pre-condition is not specified, it is as set out below:

| | Operating Parameter | |
|---|---|---|
| | Surface temperature of mould (° C.) | Mould Condition (Dryness: Wet/ Partially Dry/Dried) |
| Pre-condition 1 of the mould coated with $Ca^{2+}$ prior to dipping | See example details - 59° C. if not specified | See example details - Partial Dry/Dried if not specified |

1.5 First Stage Dipping

The mould following step 1.4 is dipped into a tank of composition for forming an elastomeric film, containing the components specified for the given example. The conditions in the first stage dipping step are as follows:

| | Operating Parameter | | | |
|---|---|---|---|---|
| Tank | Temperature (°C.) | Dwell Time (second) | TSC (%) | pH |
| First stage dipping tank | See example details. 40-42 if not specified | See example details - 4 seconds if not specified | See example details | See example details |

1.6 Partial Drying

Unless otherwise specified to test the impact of the degree of drying on the final product, the dipped mould is passed through an oven held at the temperature for the time indicated below. In some examples, the degree of drying following the first stage dipping is modified from this parameter to demonstrate the impact that a different degree of drying has on the final product.

| | Operating Parameter | |
|---|---|---|
| Oven | Temperature (°C.) | Time (second) |
| Gelling Oven 1 | 120 unless otherwise specified. | 12 unless otherwise specified. |

1.7 Pre-Condition 2

The partial drying as described in step 1.6 is used to obtain certain "preconditions" for the layer coated onto the mould, prior to proceeding to the next step. Pre-condition 2 refers to the conditions of surface temperature and "dryness" of the mould coated with the first layer of composition for forming an elastomeric film achieved following (partial) drying, prior to continuing to the next step. In some examples, pre-condition 2 is manipulated to demonstrate the impact that pre-condition 2 has on the final product. Where specific conditions for pre-condition 2 are not specified, the conditions are as set out below:

| | Operating Parameter | | |
|---|---|---|---|
| | Surface Temperature of mould (°C.) | Mould Condition (Dryness: Wet/ Partially Dry/Dried) | Water Content (%) |
| Pre-condition 2 | Around 40-44° C., unless otherwise specified | Partially Dried unless otherwise specified | As specified - generally 85%-22% unless different conditions tested. Most typically around 50%-70%. |

1.8 Second Stage Dipping

The mould following step 1.7 is dipped into a tank of composition for forming an elastomeric film, containing the components specified for the given example. The conditions in the second stage dipping step are as follows:

| | Operating Parameter | | | |
|---|---|---|---|---|
| Tank | Temperature (°C.) | Dwell Time (second) | TSC (%) | pH |
| Second stage dipping tank | See example details. 40-42 if not specified | See example details - 4 s. if not specified | See example details | See example details |

1.9 Partial Drying

Unless otherwise specified to test the impact of the degree of drying on the final product, the dipped mould is passed through an oven held at the indicated temperature for the time indicated below. In some examples, the degree of drying following the second stage dipping is modified from this parameter to demonstrate the impact that a different degree of drying has on the final product.

| | Operating Parameter | |
|---|---|---|
| Oven | Temperature (°C.) | Time (second) |
| Gelling Oven 2 | 90-110 unless otherwise specified | 12 unless otherwise specified |

1.10 Pre-Condition 3

The partial drying as described in step 1.9 is used to obtain certain "pre-conditions" for the layer coated onto the mould, prior to proceeding to the next step. Pre-condition 3 refers to the conditions of surface temperature and "dryness" of the combination of layers coated on the mould achieved following (partial) drying, prior to continuing to the next step. In some examples, pre-condition 3 is manipulated to demonstrate the impact that pre-condition 3 has on the final product. Where specific conditions for pre-condition 3 are not specified, the conditions are as set out below:

| | Operating Parameter | | |
|---|---|---|---|
| | Temperature Surface Of mould (°C.) | Mould Condition (Dryness: Wet/ Partially Dry/ Dried) | Water Content (%) |
| Pre-condition 3 of the mould coated with 1st and 2nd dipping compositions | About 41, unless otherwise specified | Partially Dried, unless otherwise specified | As specified - generally 85%-22% unless different conditions tested. Most typically around 50%-70%. |

1.11 Third Stage Dipping

The mould following step 1.10 is dipped into a tank of composition for forming an elastomeric film, containing the components specified for the given example. The conditions in the third stage dipping step are as follows:

| Tank | Operating Parameter | | | |
|---|---|---|---|---|
| | Temperature (°C.) | Dwell Time (second) | TSC (%) | pH |
| Latex Dipping Tank 3 | See example details. About 30 (29-34) if not specified | See example details. About 4 if not specified | See example details | See example details |

1.12 Beading

The product following third stage dipping is subjected to beading.

1.13 Drying

The product following third stage dipping, and beading, is oven dried at a temperature between 80° C. and 120° C. for around 60 seconds.

1.14 Pre-Cure Leaching

Pre-leaching is conducted by rinsing in warm water for a short period of time.

The beading, drying and pre-cure leaching steps could be carried out in any order. The processes of beading and pre-cure leaching could be exchange depending on the quality of cuff beading.

1.15 Curing

Oven curing is conducted through ovens having 4 zones set at successive temperatures of 118, 105, 135 and 108° C., taking approximately 4-6 minutes to progress through each zone.

1.16 Post Curing Steps

The product is water cooled, chlorinated in a 745 ppm chorine solution at pH 2.0 held at 52° C. for 50 seconds, neutralized and rinsed in water, dried and stripped from the mould.

Example 1

Gloves were produced using Procedure 2, which is within the framework of General Procedure 1, from Glove Composition 1 outlined in Table 1. It is noted that some parameters varied a little between individual samples, and where this occurred this is indicated by a range that covers the variations.

The gloves produced were of good quality, with good adhesion between the layers of elastomeric film, good pick-up of latex composition, no latex flow mark, no rubber lump formation, no thin or weak spots, no pin-holes and no shrinkage. The gloves were found to have an average durability time of 4 hours (4.012 hours) when subjected to the durability test over 50 samples.

Procedure 2:

1.1 Washing as Described in General Procedure 1.

1.2 Coagulant Dipping in Accordance with the Following Parameters.

| Tank | Operating Parameter | | | |
|---|---|---|---|---|
| | Temperature (°C.) | Dwell Time (second) | Ca(NO$_3$)$_2$ (% in water) | pH |
| Coagulant Dipping Tank | 53-57 | 2 | 10.1-10.8 | 7.2-7.5 |

1.3 Oven Drying in Accordance with the Following Parameters:

| Oven | Operating Parameter | |
|---|---|---|
| | Temperature (°C.) | Time (second) |
| Coagulant Oven Blower | 135 | 38 |

1.4 Pre-Condition 1 Parameters:

| | Operating Parameter | |
|---|---|---|
| | Surface temperature of mould (°C.) | Mould Condition (Dryness: Wet/ Partially Dry/Dried) |
| Pre-condition 1 | 59 | Partial Dry/Dried |

1.5 First Stage Dipping Parameters:

| Tank | Operating Parameter | | | |
|---|---|---|---|---|
| | Temperature (°C.) | Dwell Time (second) | TSC (%) | pH |
| Dipping Tank 1 | Target 40 (between 40-42) | 4 | Target 17.0 (16.8-17.4) | Target 9.2 (9.0-9.3) |

1.6 Partial Drying Parameters as Described in General Procedure 1(120° C. for 12 Seconds).

1.7 Pre-Condition 2 Parameters:

| | Operating Parameter | | |
|---|---|---|---|
| | Surface Temperature of mould (°C.) | Mould Condition (Dryness: Wet/ Partially Dry/ Dried) | Water Content (%) |
| Pre-condition 2 | 44 | Partially Dried | 67.28 |

1.8 Second Stage Dipping Parameters:

| Tank | Operating Parameter | | | |
|---|---|---|---|---|
| | Temperature (°C.) | Dwell Time (second) | TSC (%) | pH |
| Dipping Tank 2 | Target 37 (37-40) | 4 | 15.9 (15.8-16.5) | Target 9.0 (9.2-9.3) |

1.9 Partial Drying Parameters as Described in General Procedure 1(90-110° C. for 12 Seconds).

1.10 Pre-Condition 3 Parameters:

| | Operating Parameter | | |
|---|---|---|---|
| | Surface Temperature Of mould (° C.) | Mould Condition (Dryness: Wet/ Partially Dry/ Dried) | Water Content (%) |
| Pre-condition 3 | 41 | Partially Dried | 57.50 |

1.11 Third Stage Dipping Parameters:

| | Operating Parameter | | | |
|---|---|---|---|---|
| Tank | Temperature (° C.) | Dwell Time (second) | TSC (%) | pH |
| Dipping Tank 3 | Target 30(29-34) | 4 | 18.2 (+/− 0.2) | 9.2 (+/− 0.1) |

1.12-1.16 Steps were Performed as Outlined in General Procedure 1.

Example 2

This example demonstrates multilayer gloves can be made when using different process conditions and a different composition to that used in Example 1 above. Gloves were produced using Procedure 3, which is within the framework of General Procedure 1, from Glove Composition 2 outlined in Table 2. It is noted that some parameters varied a little between individual samples, and where this occurred is indicated by the range that covers the variations.

The gloves produced were of good quality, with good adhesion between the layers of elastomeric film, good pick-up of latex composition, no latex flow mark, no rubber lump formation, no thin or weak spots, no pin-holes and no shrinkage. The gloves were found to have an average durability time of 3 hours 53 minutes (3.875 hours) when subjected to the durability test over 50 samples.

Procedure 3:

1.1 Washing as Described in General Procedure 1.

1.2 Coagulant dipping in accordance with the following parameters. It is noted that the calcium concentration is lower and the pH higher than for Procedure 2 in order to form a thinner film.

| | Operating Parameter | | | |
|---|---|---|---|---|
| Tank | Temperature (° C.) | Dwell Time (second) | Ca(NO$_3$)$_2$ (% in water) | pH |
| Coagulant Dipping Tank | 56 | 2 | 6.9 | 8.7 |

1.3 Oven Drying in Accordance with the Following Parameters:

| | Operating Parameter | |
|---|---|---|
| Oven | Temperature (° C.) | Time (second) |
| Coagulant Oven Blower | 135 | 38 |

1.4 Pre-Condition 1 Parameters:

| | Operating Parameter | |
|---|---|---|
| | Surface temperature of mould (° C.) | Mould Condition (Dryness: Wet/ Partially Dry/Dried) |
| Pre-condition 1 | 59 | Partial Dry/Dried |

1.5 First Stage Dipping Parameters:

| | Operating Parameter | | | |
|---|---|---|---|---|
| Tank | Temperature (° C.) | Dwell Time (second) | TSC (%) | pH |
| Dipping Tank 1 | 40 | 4 | 14.3 | 9.6 |

1.6 Partial Drying Parameters as Described in General Procedure 1(120° C. for 12 Seconds).

1.7 Pre-Condition 2 Parameters:

| | Operating Parameter | | |
|---|---|---|---|
| | Surface Temperature of mould (° C.) | Mould Condition (Dryness: Wet/ Partially Dry/ Dried) | Water Content (%) |
| Pre-condition 2 | 40 | Partially Dried | 73.98 |

1.8 Second stage dipping parameters. It is noted that the total solids content is lower than that used in Procedure 2.

| | Operating Parameter | | | |
|---|---|---|---|---|
| Tank | Temperature (° C.) | Dwell Time (second) | TSC (%) | pH |
| Dipping Tank 2 | 37 | 4 | 14.1 | 9.8 |

1.9 Partial Drying Parameters as Described in General Procedure 1 (90-110° C. for 12 Seconds).

1.10 Pre-Condition 3 Parameters:

| | Operating Parameter | | |
|---|---|---|---|
| | Temperature Surface Of mould (° C.) | Mould Condition (Dryness: Wet/ Partially Dry/ Dried) | Water Content (%) |
| Pre-condition 3 | 41 | Partially Dried | 65.64 |

1.11 Third stage dipping parameters. It is noted that the TSC is lower than that used in Example 1.

| | Operating Parameter | | | |
|---|---|---|---|---|
| Tank | Temperature (° C.) | Dwell Time (second) | TSC (%) | pH |
| Dipping Tank 3 | 30 | 4 | 17.8 | 9.6 |

1.12-1.16 Steps were Performed as Outlined in General Procedure 1.

Example 3

Example 3 demonstrates that multilayer gloves can be made when using a range of different process conditions within the invention and a range of different glove compositions. The glove compositions tested in Example 3 are those of Glove Composition 3 outlined in the combination of Tables 3 and 4. The compositions tested in this Example contain varying amounts of metal oxide crosslinking agent (MgO was the test metal oxide), or non-metal oxide (TETD was the test agent), combined with varying concentrations of coagulant solution and varying total solids contents of the latex composition. The various combinations of variants produced 48 different glove samples. The compositions in this example were accelerator-free.

The process used to produce the gloves was General Procedure 1, in which the parameters were controlled as outlined in the Table 6. The combinations of cross-linking agent, concentration of coagulant solution, the total solids content of the composition for forming an elastomeric film and dwell time used are shown in Table 6. The thickness of the various layers formed was measured for some of the multi-layered elastomeric gloves produced. The extent of barrier defects, durability, stickiness and evenness of coating for the multi-layered elastomeric gloves produced were assessed as described in the Testing Technique section at the end of the Examples. The results are shown in Table 6.

Gloves were also produced from the Glove Composition 4 outlined in Table 5 which contains 1.50 phr of ZnO and 0.20 phr of sulphur as crosslinking agent, 0.2 phr of antioxidant, and no accelerator. The procedure was as described for the production of gloves in Example 3. The gloves produced from the accelerator-free compositions were of good quality.

Example 4

Example 4 was conducted to confirm and demonstrate the finding that improved glove quality can be achieved by only partially drying each layer of composition prior to applying the next layer of composition for forming the elastomeric film. The test results also determined and demonstrate a range of favourable conditions of water contents and surface temperatures for easy coating.

This example was conducted in two parts. In both parts of Example 4, Glove Composition 1 was utilised as the test composition.

Other tests were conducted (results not reported), on corresponding compositions containing between 0.2 to 4.0 phr of MgO, BaO, $Al_2O_3$, peroxide and DPG as the cross-linking agents. The results confirmed that the partial drying principle applies equally to compositions containing these cross-linking agents.

In the first part, the temperature of the drying oven was kept at a constant 120° C., and the time that the mould coated with the first layer of composition was in the oven prior to the dipping in a second layer of composition was adjusted from 0 seconds up to 1000 seconds. For the samples dried for a time of 240 seconds or less, the glove was subjected to a second stage of partial drying followed by a third dipping to produce a third layer of composition. The third stage dipping was not performed for samples dried for more than 240 seconds, as the 2-layer products were already showing signs of poor quality. This test revealed the impact that greater drying times have on the surface temperature of the coating on the mould, on the water content of the layer, and then on the product quality of the glove produced.

The first part of Example 4 was conducted in accordance with General Procedure 1, with the following parameters:

Step 1.2 Coagulant dipping at 60° C. (58 to 61° C.), pH 7.6, 8.7% $Ca(NO_3)_2$.

Step 1.3 Oven set at 120° C.

Step 1.4 Surface temperature of about 59° C. (between 53 to 70° C.)

Step 1.5 Dipping in Glove Composition 1 at 16.7% total solids concentration, pH 9.7, 29° C. for 5 seconds Step 1.6 Partial drying at 120° C. for the time period indicated in the first column of Table 7

Step 1.7 Pre-condition 2 as indicated in Table 7

Step 1.8 Dipping in Glove Composition 1 at 16.7% total solids concentration, pH 9.7, 29° C. for 5 seconds Steps 1.9-1.11 conducted for samples dried in drying oven 1 for up to 240 seconds, but not conducted for samples dried for more than 240 seconds previously (2 layers only); corresponding water contents calculated at the end of the procedure.

Step 1.9 Partial drying 2 conducted at 120° C. for the time period indicated in Table 7 (0 to 240 seconds)

Step 1.10 Pre-condition 3 as indicated in Table 7.

Step 1.11 Dipping in Glove Composition 1 at 16.7% total solids concentration, pH 9.7, 29° C. for 5 seconds.

Steps 1.12-1.16 as described in General Procedure 1.

The results of Example 4 part 1 are shown in Table 7.

In the second part, the temperature of the drying oven following first stage dipping was kept at a constant 120° C., but this time the first-layer coated mould was held in the oven for a time of between 240 seconds and 1000 seconds as indicated in Table 8, followed by cooling to reduce the surface temperature to 40° C. The heating and cooling was followed by the second stage dipping. This test explored whether the important factor to control in the process was the surface temperature of the layer of film prior to dipping a subsequent layer, or the water content.

The second part of Example 4 was conducted in accordance with General Procedure 1, with the following parameters:
Step 1.2 Coagulant dipping at 60° C. (58 to 62° C.), pH 7.6, 8.6% Ca(NO$_3$)$_2$.
Step 1.3 Oven set at 120° C.
Step 1.4 Surface temperature of about 59° C. (between 56 to 70° C.)
Step 1.5 Dipping in Glove Composition 1 at 17% total solids concentration, pH 9.7, 25° C. for 5 seconds
Step 1.6 Partial drying at 120° C. for a time period between 240 seconds and 1000 seconds, as indicated in Table 8
Step 1.7 Allowing the surface to cool to about 40° C., before progressing to step 1.8; corresponding water content calculated at the end of the procedure.
Step 1.8 Dipping in Glove Composition 1 at 17% total solids concentration, pH 9.7, 25° C. for 5 seconds
Steps 1.9-1.11 not conducted (2 layers only)
Steps 1.12-1.16 as described in General Procedure 1.

The results of Example 4 part 2 are shown in Table 8.

The combination of the test results for parts 1 and 2 of Example 4 show that the important factor to control is the water content, and that partial drying should not be progressed to an extent such that the water content of the layers of composition falls below 22%. Below this water content level the glove quality drops off, with a poor pick-up of the composition (poor adhesion between the layers) and an increase in shrinkage.

Example 5

Example 5 was conducted to confirm and demonstrate the finding that improved glove quality can be achieved by only partially drying each layer of composition prior to applying the next layer of composition for forming the elastomeric film.

In Example 5, the impact of different levels of drying before each layer is coated onto the mould was tested. In part A, the impact of different drying levels of the coagulant before the first layer was dipped was tested, in part B the impact of different drying levels of the first layer before the second layer was dipped was tested, and in part C, the impact of the different drying levels of the second layer before the third layer was dipped was tested. In all other respects, the process conditions were kept uniform.

The tests were conducted using Glove Composition 1, and General Procedure 1, with the process parameters controlled as outlined in Tables 9A, 9B and 9C, and as follows:
Step 1.2 Coagulant dipping at 60° C. (58 to 61° C.), 9.3% Ca(NO$_3$)$_2$, pH 7.8.
Step 1.3 For part 9A, the oven temperature was set to a suitable level, and the time in the oven controlled, to get to a surface temperature in the target range for testing, the target range being set out in the left hand column of Table 9A. In some cases no drying in the oven was required—instead the layers were allowed to cool in ambient conditions. For parts 9B and 9C, the oven was set to 120° C.
Step 1.4 For part 9A, the surface temperature was as identified in Table 9A. For parts 9B and 9C, the surface temperature was around 59° C. (between 59° C. and 81° C.)
Step 1.5 Dipping in Glove Composition 1 at 17.5% total solids concentration, pH 9.7, 29° C. for 5 seconds
Step 1.6 For part 9A, the oven was set to 120° C. and observations were made on the coating quality and recorded under "Observations after 1$^{st}$ dip layer". The testing ended for part 9A here. For part 9B, the oven temperature was set to the necessary level to achieve a surface temperature for the first layer on the mould to be within the target range for testing. The target range is set out in the left hand column of Table 9B. For part 9C, the oven was set to 120° C. for partial drying.
Step 1.7 The surface temperature for Pre-condition 2 for part 9B is indicated in Table 9B. The surface temperature for part 9C was between 45° C. and 52° C.
Step 1.8 Dipping in Glove Composition 1 at 17.5% total solids concentration, pH 9.7, 29° C. for 5 seconds for parts 9B and 9C.
Step 1.9 The oven temperature for part 9B was set to 120° C. and observations were made on the coating quality and recorded under "Observations after 2$^{nd}$ dip layer" in Table 9B. The testing ended for part 9B here. The degree of drying for part 9C was controlled to attempt to reach the desired surface temperature range indicated in the left hand column of Table 9C. The oven temperature was set to a suitable level, and the time in the oven controlled, to get to a surface temperature in this range. In some cases no drying in the oven was required—instead the layers were allowed to cool in ambient conditions.
Step 1.10 The surface temperature for Pre-condition 3 for part 9C is indicated in Table 9C.
Step 1.11 Dipping in Glove Composition 1 at 17.5% total solids concentration, pH 9.7, 29° C. for 5 seconds for part 9C.
Step 1.12 The product from step 1.11 was dried in an oven at 120° C., while observations were made and recorded under "Observations on 3$^{rd}$ dip layer" in Table 9C.

In this example, the drying conditions were varied to determine and demonstrate the properties of films/gloves produced with a different extent of drying of the layers of elastomeric film on the mould prior to application of a further layer of elastomeric film.

Changes were made to the surface temperature of the mould prior to the first dipping in the composition for forming an elastomeric film (pre-condition 1) and to the water content and surface temperature of the layers of elastomeric film on the mould prior to the second and third dipping in the composition for forming an elastomeric film (pre-conditions 2 and 3).

Total water content, latex pick up, flow marks, lumping, weak spots, pin holes and shrinkage of the layers after dipping were assessed.

The results of the assessment are set out in Tables 9A to 9C. Table 9A sets out the results of the experiment conducted to examine the effect of changes to pre-condition 1 on the formation of the first layer of elastomeric film. Table 9B sets out the results of the experiment conducted to examine the effect of changes to pre-condition 2 on the formation of the second layer of elastomeric film. Table 9C sets out the results of the experiment conducted to examine the effect of changes to pre-condition 3 on the formation of the third layer of elastomeric film. It is noted that the procedure used to determine the water content of a particular product results in destruction of the product, and therefore separate trials were required to build up the water content results for each layer, giving the set of tables A, B and C.

In these tables, "dried" refers to a water content of between 1-22%, and "partially dried" refers to a water content of >22%.

The results show that the water content of the films following drying (specifically, partial drying) is critical to the properties of the film/glove produced. The results also show that the surface temperature is not critical for easy/good coating, provided that the necessary water content corresponding to partial drying is achieved.

Example 6

Example 6 was conducted to investigate in more detail the impact that higher drying temperatures (combined with shorter drying times) have on the elastomeric films/gloves produced in the process. It was desired to investigate the effect of changes in the water content and surface temperature of the layer or layers of elastomeric film on the mould following application of a further layer of elastomeric film (e.g. the effect of changes to pre-condition 2).

The tests were conducted using Glove Composition 1, and General Procedure 1, with the process parameters controlled as follows:

Step 1.2 Coagulant dipping at 60° C. (60 to 62° C.), pH 7.9, 9.7% Ca(NO$_3$)$_2$.

Step 1.3 Oven set at 120° C.

Step 1.4 Surface temperature of about 59° C. (between 55 to 68° C.)

Step 1.5 Dipping in Glove Composition 1 at 17.20 total solids concentration, pH 9.7, at a temperature between 25° C.-29° C. for 5 seconds Step 1.6 Drying at a high temperature of 247° C. for a time period between 10 seconds and 350 seconds, as indicated in Table 10

Step 1.7 Pre-condition 2 details including the surface temperature was calculated for two samples and averaged. At the end of the procedure the water content was also calculated and recorded. The averaged data is presented in Table 10.

Step 1.8 Dipping in Glove Composition 1 at 17.2% total solids concentration, pH 9.7, 26° C.-29° C. for 5 seconds. Observations were then made on the quality of the coating on the mould following this second dipping.

Steps 1.9-1.11 not conducted (2 layers only)

Steps 1.12-1.16 as described in General Procedure 1.

The results of this Example show that the combination of a high surface temperature with low water content (lower than 22%) results in coating difficulties and a poor product. The results also show that a combination of a lower surface temperature with a higher water content (one above 22%) result in a good quality of coating. Thirdly, the results show that when the water content is low due to the fast/high heating conditions, but the surface temperature is within the range found to give good coating results in previous examples (due to the short time of heating), despite the good surface temperature, the coating quality and product is poor. This shows that the critical factor to control to achieve optimum coating and product quality is the water content, and not the surface temperature or duration of heating.

Tables

Glove Compositions Used in Examples:

TABLE 1

| Glove Composition 1 | |
|---|---|
| Ingredient Part per hundred of dry "rubber" | phr |
| Carboxylated Nitrile Butadiene Rubber | 100 |
| Potassium Hydroxide | 1.50 |
| Cross-linking agent | |
| (i) Zinc Oxide | 0.70 |
| (ii) Sulfur | 1.10 |
| Accelerator | |
| (i) Zinc Dibutyl Dithiocarbamate | 0.65 |
| Antioxidant | |
| (i) Wingstal L (the product of p-cresol and dicyclopentadiene) | 0.20 |
| Titanium Dioxide | 3.50 |
| Colorant: | |
| Flexobrite Blue BRN | 0.14 |
| Water | Amount to reach TSC |

TABLE 2

| Glove Composition 2 | |
|---|---|
| Ingredient Part per hundred of dry "rubber" | phr |
| Carboxylated Nitrile Butadiene Rubber | 100 |
| Potassium Hydroxide | 1.50 |
| Cross-linking agent | |
| (i) Zinc Oxide | 1.07 |
| (ii) Sulfur | 1.05 |
| Accelerator | |
| (i) Zinc Dibutyl Dithiocarbamate | 0.35 |
| Antioxidant | |
| (i) Wingstal L (the product of p-cresol and dicyclopentadiene) | 0.20 |
| Titanium Dioxide | 4.00 |
| Colorant: | |
| Flexobrite Violet 411/78S | 0.32 |
| Flexobrite Sky Blue 72249 | 0.19 |
| Flexobrite Carmine 11/78 | 0.01 |
| Water | Amount to reach TSC |

TABLE 3

| Glove Composition 3 | |
|---|---|
| Ingredient Part per hundred of dry "rubber" | phr |
| Carboxylated Nitrile Butadiene Rubber | 100 |
| Potassium Hydroxide | 1.5 |
| Cross-linking agent | |
| (i) Metallic Oxide/Non Metallic Oxide | As shown in Table 4 |
| (ii) Sulfur | 0.10 |

TABLE 3-continued

Glove Composition 3

| Ingredient Part per hundred of dry "rubber" | phr |
|---|---|
| Antioxidant | |
| (i) Wingstal L (the product of p-cresol and dicyclopentadiene) | 0.40 |
| Titanium Dioxide | 4.0 |
| Colorant: | |
| Flexobrite Violet 411/78S | 0.14 |
| Flexobrite Sky Blue 72249 | 0.09 |
| Flexobrite Carmine 11/78 | 0.01 |
| Water | Amount to reach TSC |

TABLE 4

Cross-linking agent (CLA) used and amount

| Cross-Linking Agent | Part per hundred of dry rubber | | | |
|---|---|---|---|---|
| MgO (Magnesium Oxide) | 0.5 | 2.0 | 4.0 | 8.0 |
| TETD (Tetraethylthiuramdisulfide) | 0.5 | 2.0 | 4.0 | 8.0 |

TABLE 5

Glove Composition 4

| Ingredient Part per hundred of dry "rubber" | phr |
|---|---|
| Carboxylated Nitrile Butadiene Rubber | 100 |
| Potassium Hydroxide | 1.50 |
| Cross-linking agent | |
| (i) Zinc Oxide | 1.50 |
| (ii) Sulfur | 0.20 |
| Antioxidant | |
| (i) Wingstal L (the product of p-cresol and dicyclopentadiene) | 0.20 |
| Titanium Dioxide | 4.00 |
| Colorant: | |
| Flexobrite Violet 411/78S | 0.14 |
| Flexobrite Sky Blue 72249 | 0.09 |
| Flexobrite Carmine 11/78 | 0.01 |
| Water | Amount to reach TSC |

TABLE 6

| CLA | pHr | Coagulant Solution Ca(NO$_3$)$_2$ (%) | Latex TSC (%) | Latex TEMP (°C.) | Time (sec) | Thickness (mm) Layer 1 | Thickness (mm) Layer 2 | Thickness (mm) Layer 3 | Water Leakage | Barrier Defect Compliance to ASTM D6319 (Pass/Fail) | Durability (hour) | Stickiness | Eveness of Coating |
|---|---|---|---|---|---|---|---|---|---|---|---|---|---|
| MgO | 0.5 | 0.5 | 3 | 10 | 1 | 0.05 | 0.05 | 0.05 | 1/100 | Pass | OK | Minimal | Even |
| | | 5.0 | 10 | 25 | 5 | N.C. | N.C. | N.C. | 1/100 | Pass | Good | Minimal | Even |
| | | 10.0 | 20 | 40 | 10 | N.C. | N.C. | N.C. | 1/100 | Pass | Good | None | Even |
| | | 15.0 | 25 | 50 | 15 | N.C. | N.C. | N.C. | 1/100 | Pass | Good | None | Even |
| | | 20.0 | 30 | 60 | 20 | 0.12 | 0.04 | 0.04 | 1/100 | Pass | Good | None | Even |
| | | 30.0 | 40 | 60 | 5 | 0.22 | 0.04 | 0.04 | 0/100 | Pass | Good | None | Even |
| | 2.0 | 0.5 | 3 | 10 | 1 | N.C. | N.C. | N.C. | 1/100 | Pass | Good | Minimal | Even |
| | | 5.0 | 10 | 25 | 5 | N.C. | N.C. | N.C. | 1/100 | Pass | Good | None | Even |
| | | 10.0 | 20 | 40 | 10 | N.C. | N.C. | N.C. | 0/100 | Pass | Good | None | Even |
| | | 15.0 | 25 | 50 | 15 | N.C. | N.C. | N.C. | 0/100 | Pass | Good | None | Even |
| | | 20.0 | 30 | 60 | 20 | 0.13 | 0.05 | 0.04 | 0/100 | Pass | Good | None | Even |
| | | 30.0 | 40 | 60 | 5 | 0.21 | 0.04 | 0.06 | 0/100 | Pass | Good | None | Even |
| | 4.0 | 0.5 | 3 | 10 | 1 | N.C. | N.C. | N.C. | 1/100 | Pass | Good | None | Even |
| | | 5.0 | 10 | 25 | 5 | N.C. | N.C. | N.C. | 0/100 | Pass | Good | None | Even |
| | | 10.0 | 20 | 40 | 10 | N.C. | N.C. | N.C. | 0/100 | Pass | Good | None | Even |
| | | 15.0 | 25 | 50 | 15 | N.C. | N.C. | N.C. | 0/100 | Pass | Good | None | Even |
| | | 20.0 | 30 | 60 | 20 | 0.13 | 0.04 | 0.04 | 0/100 | Pass | Good | None | Even |
| | | 30.0 | 40 | 60 | 5 | 0.21 | 0.04 | 0.05 | 0/100 | Pass | Good | None | Even |
| | 8.0 | 0.5 | 3 | 10 | 1 | N.C. | N.C. | N.C. | 1/100 | Pass | Good | None | Even |
| | | 5.0 | 10 | 25 | 5 | N.C. | N.C. | N.C. | 0/100 | Pass | Good | None | Even |
| | | 10.0 | 20 | 40 | 10 | N.C. | N.C. | N.C. | 0/100 | Pass | Good | None | Even |
| | | 15.0 | 25 | 50 | 15 | N.C. | N.C. | N.C. | 0/100 | Pass | Good | None | Even |
| | | 20.0 | 30 | 60 | 20 | 0.13 | 0.04 | 0.04 | 0/100 | Pass | Good | None | Even |
| | | 30.0 | 40 | 60 | 5 | 0.21 | 0.04 | 0.05 | 0/100 | Pass | Good | None | Even |
| TETD | 0.5 | 0.5 | 3 | 10 | 1 | N.C. | N.C. | N.C. | 1/100 | Pass | 1 | 2 | 1 |
| | | 5.0 | 10 | 25 | 5 | N.C. | N.C. | N.C. | 1/100 | Pass | 1 | 1 | 1 |
| | | 10.0 | 20 | 40 | 10 | N.C. | N.C. | N.C. | 0/100 | Pass | 1 | 1 | 1 |
| | | 15.0 | 25 | 50 | 15 | N.C. | N.C. | N.C. | 0/100 | Pass | 1 | 1 | 1 |
| | | 20.0 | 30 | 60 | 20 | 0.13 | 0.05 | 0.04 | 0/100 | Pass | 1 | 1 | 1 |
| | | 30.0 | 40 | 60 | 5 | 0.21 | 0.04 | 0.06 | 0/100 | Pass | 1 | 1 | 1 |
| | 2.0 | 0.5 | 3 | 10 | 1 | N.C. | N.C. | N.C. | 1/100 | Pass | 1 | 1 | 1 |
| | | 5.0 | 10 | 25 | 5 | N.C. | N.C. | N.C. | 1/100 | Pass | 1 | 1 | 1 |
| | | 10.0 | 20 | 40 | 10 | N.C. | N.C. | N.C. | 0/100 | Pass | 1 | 1 | 1 |
| | | 15.0 | 25 | 50 | 15 | N.C. | N.C. | N.C. | 0/100 | Pass | 1 | 1 | 1 |
| | | 20.0 | 30 | 60 | 20 | 0.12 | 0.05 | 0.04 | 0/100 | Pass | 1 | 1 | 1 |
| | | 30.0 | 40 | 60 | 5 | 0.20 | 0.05 | 0.05 | 0/100 | Pass | 1 | 1 | 1 |

TABLE 6-continued

| | | Coagulant Solution | | Latex | | | Thickness (mm) | | | Barrier Defect | | | | |
|---|---|---|---|---|---|---|---|---|---|---|---|---|---|---|
| | | | | | | | | | | Water Leakage | Compliance to ASTM D6319 (Pass/Fail) | Durability (hour) | Sticki-ness | Eveness of Coating |
| CLA | pHr | Ca(NO$_3$)$_2$ (%) | TSC (%) | TEMP (°C.) | Time (sec) | Layer 1 | Layer 2 | Layer 3 | | | | | | |
| | 4.0 | 0.5 | 3 | 10 | 1 | N.C. | N.C. | N.C. | 1/100 | Pass | 1 | 1 | 1 | |
| | | 5.0 | 10 | 25 | 5 | N.C. | N.C. | N.C. | 0/100 | Pass | 1 | 1 | 1 | |
| | | 10.0 | 20 | 40 | 10 | N.C. | N.C. | N.C. | 0/100 | Pass | 1 | 1 | 1 | |
| | | 15.0 | 25 | 50 | 15 | N.C. | N.C. | N.C. | 0/100 | Pass | 1 | 1 | 1 | |
| | | 20.0 | 30 | 60 | 20 | 0.12 | 0.05 | 0.04 | 0/100 | Pass | 1 | 1 | 1 | |
| | | 30.0 | 40 | 60 | 5 | 0.20 | 0.05 | 0.05 | 0/100 | Pass | 1 | 1 | 1 | |
| | 8.0 | 0.5 | 3 | 10 | 1 | N.C. | N.C. | N.C. | 1/100 | Pass | 1 | 1 | 1 | |
| | | 5.0 | 10 | 25 | 5 | N.C. | N.C. | N.C. | 1/100 | Pass | 1 | 1 | 1 | |
| | | 10.0 | 20 | 40 | 10 | N.C. | N.C. | N.C. | 0/100 | Pass | 1 | 1 | 1 | |
| | | 15.0 | 25 | 50 | 15 | N.C. | N.C. | N.C. | 0/100 | Pass | 1 | 1 | 1 | |
| | | 20.0 | 30 | 60 | 20 | 0.13 | 0.05 | 0.04 | 0/100 | Pass | 1 | 1 | 1 | |
| | | 30.0 | 40 | 60 | 5 | 0.21 | 0.04 | 0.05 | 0/100 | Pass | 1 | 1 | 1 | |

N.C. = not calculated

TABLE 7

| Time in drying oven 1 (following 1$^{st}$ dip) | Pre-Condition 2 | | Observation on quality of 2$^{nd}$ dip layer | | | | |
|---|---|---|---|---|---|---|---|
| | Surface Temp (°C.) | Water Content (%) | Latex Pick Up | Latex Flow Mark | Rubber Lump Formation | Thin/ Weak Spot | Shrinkage |
| 0 | 53 | 90.70 | Good | No | No | No | Yes |
| 2 | 51 | 74.64 | Good | No | No | No | No |
| 4 | 51 | 61.96 | Good | No | No | No | No |
| 6 | 48 | 67.04 | Good | No | No | No | No |
| 8 | 45 | 84.56 | Good | No | No | No | No |
| 10 | 46 | 55.17 | Good | No | No | No | No |
| 12 | 48 | 69.17 | Good | No | No | No | No |
| 20 | 52 | 72.14 | Good | No | No | No | No |
| 40 | 44 | 73.35 | Good | No | No | No | No |
| 60 | 42 | 73.76 | Good | No | No | No | No |
| 80 | 40 | 74.02 | Good | No | No | No | No |
| 100 | 42 | 68.75 | Good | No | No | No | No |
| 120 | 42 | 64.10 | Good | No | No | No | No |
| 150 | 44 | 63.07 | Good | No | No | No | No |
| 180 | 41 | 64.38 | Good | No | No | No | No |
| 210 | 44 | 61.18 | Good | No | No | No | No |
| 240 | 45 | 48.10 | Good | No | No | No | No |
| 300 | 39 | 29.22 | Good | No | No | No | No |
| 300* | 44 | 29.34 | Good | No | No | No | No |
| 350 | 40 | 16.58 | No | No | No | No | Yes |
| 350* | 43 | 16.79 | No | No | No | No | Yes |
| 350* | 41 | 21.66 | No | No | No | No | No |
| 400 | 44 | 26.87 | No | No | No | No | Yes |
| 400* | 56 | 1.88 | No | No | No | No | No |
| 450 | 41 | 83.13 | No | No | No | No | Yes |
| 450* | 41 | 6.00 | No | No | No | No | No |
| 500 | 45 | 7.05 | No | Yes | No | No | Yes |
| 550 | 39 | 6.68 | No | Yes | No | No | Yes |
| 600 | 62 | 1.79 | No | Yes | No | No | Yes |
| 650 | 52 | 3.82 | No | Yes | No | No | Yes |
| 700 | 77 | 1.95 | No | Yes | No | No | Yes |
| 750 | 75 | 0.81 | No | Yes | No | No | Yes |
| 800 | 70 | 0.93 | No | Yes | No | No | Yes |
| 850 | 73 | 0.62 | No | Yes | No | No | Yes |
| 900 | 73 | 4.00 | No | Yes | No | No | Yes |

TABLE 7-continued

| | | | | | | | | |
|---|---|---|---|---|---|---|---|---|
| 950 | 80 | 2.76 | No | Yes | No | No | Yes | |
| 1000 | 91 | 3.07 | No | Yes | No | No | Yes | |

| Time in drying oven following 2nd dip | Pre-Condition 3 | | | Observation on quality of 3rd dip layer | | | | |
|---|---|---|---|---|---|---|---|---|
| | Surface Temp (° C.) | | | | | | | |
| | Sample with first dipped layer | Sample with second dipped layer | Water Content (%) | Latex Pick Up | Latex Flow Mark | Rubber Lump Formation | Thin/ Weak Spot | Shrink- age |
| 0 | 58 | 50 | 77.81 | Good | No | No | No | No |
| 2 | 40 | 34 | 76.46 | Good | No | No | No | No |
| 4 | 41 | 35 | 78.29 | Good | No | No | No | No |
| 6 | 49 | 39 | 76.00 | Good | No | No | No | No |
| 8 | 50 | 40 | 76.45 | Good | No | No | No | No |
| 10 | 49 | 41 | 77.21 | Good | No | No | No | No |
| 12 | 49 | 39 | 76.47 | Good | No | No | No | No |
| 20 | 59 | 39 | 76.37 | Good | No | No | No | No |
| 40 | 42 | 37 | 75.61 | Good | No | No | No | No |
| 60 | 41 | 38 | 69.58 | Good | No | No | No | No |
| 80 | 40 | 35 | 66.36 | Good | No | No | No | No |
| 100 | 45 | 38 | 68.47 | Good | No | No | No | No |
| 120 | 42 | 39 | 71.07 | Good | No | No | No | No |
| 150 | 44 | 41 | 65.94 | Good | No | No | No | No |
| 180 | 46 | 42 | 55.10 | Good | No | No | No | No |
| 210 | 40 | 41 | 45.96 | Good | No | No | No | No |
| 240 | 44 | 37 | 51.54 | Good | No | No | No | No |
| 300-1000 | | | Not continued to third dip | | | | | |

*Re-test

TABLE 8

| Drying | Pre-Condition 2 | | Observations on the quality of the 2nd latex layer | | | | |
|---|---|---|---|---|---|---|---|
| Oven 1 Time (sec) | Surface Temp (° C.) | Water Content (%) | Latex Pick Up | Latex Flow Mark | Rubber Lump Formation | Thin/ Weak Spot | Shrink- age |
| 240 | 40 | 55.43 | Good | No | No | No | Yes |
| 300 | 40 | 53.15 | Good | No | No | No | No |
| 350 | 40 | 47.20 | Good | No | No | No | Yes |
| 400 | 40 | 11.56 | No | Yes | No | No | Yes |
| 450 | 40 | 21.51 | No | Yes | No | No | Yes |
| 500 | 40 | 4.06 | No | Yes | No | No | Yes |
| 550 | 40 | 2.08 | No | Yes | No | No | Yes |
| 600 | 40 | 6.15 | No | Yes | No | No | Yes |
| 650 | 40 | 7.58 | No | Yes | No | No | Yes |
| 700 | 40 | 0.79 | No | Yes | No | No | Yes |
| 750 | 40 | 7.44 | No | Yes | No | No | Yes |
| 800 | 40 | 0.65 | No | Yes | No | No | Yes |
| 850 | 40 | 4.19 | No | Yes | No | No | Yes |
| 900 | 40 | 5.58 | No | Yes | - No | No | Yes |
| 950 | 40 | 4.85 | No | Yes | No | No | Yes |
| 1000 | 40 | 5.38 | No | Yes | No | No | Yes |

TABLE 9A

| Propose Pre-Condition 1 Surface Temp (° C.) | Actual Surface Temp After Oven Heating | Observations after 1st dip layer | | | | |
|---|---|---|---|---|---|---|
| | | Observation on first latex dip layer | Latex Pick Up | Latex Flow Mark | Rubber Lump Formation | Thin/ Weak Spot | Shrink- age |
| <25 | 25 | Pick up okay | Good | Good | No | Yes | No |
| <30 | 29 | Pick up okay | Good | Good | No | Yes | No |
| 30-45 | 39 | Pick up okay | Good | Good | No | No | No |
| 45-53 | 49 | Pick up okay | Good | Good | No | No | No |
| 53-69 | 61 | Pick up okay | Good | Good | No | No | No |
| 70-80 | 70 | Pick up okay | Good | Moderate | No | No | No |
| | 75 | Pick up okay | Good | Moderate | No | No | No |
| | 80 | Pick up okay | Good | Moderate | No | No | No |
| 80-85 | 84 | Pick up okay | Good | Bad | No | No | No |
| 85-95 | 92 | Pick up okay | Good | Bad | No | Yes | Yes |
| 95-120 | 106 | Pick up okay | Good | Bad | No | Yes | Yes |
| >120 | 122 | Pick up okay but gelling film shrinkage at palm | Good | Bad | No | Yes | Yes |

TABLE 9B

| Propose Pre-Condition 2 Surface Temp (° C.) | Pre-Condition 2 | | Observations after 2$^{nd}$ dip layer | | | | |
|---|---|---|---|---|---|---|---|
| | Surface Temp before 2$^{nd}$ Latex Dip | Water Content (%) | Observation on surface after 2$^{nd}$ Dip Layer | Latex Pick | Latex flow mark | Thin/ Weak Spot | Rubber Lumps or Shrink-age |
| <25 | 25 | 64.24 | Pick up okay | Good | Good | No | No |
| 25-30 | 28 | 62.66 | Pick up okay | Good | Good | No | No |
| 30-35 | 33 | 64.36 | Pick up okay | Good | Good | No | No |
| 35-55 | 45 | 23.14 | Pick up okay | Good | Good | No | No |
| 55-65 | 60 | 1.13 | Pick up okay | Bad | Bad | Yes | No |
| 65-75 | 70 | 2.23 | Pick up okay | Bad | Bad | Yes | No |
| 75-90 | 83 | 1.07 | Pick up okay | Bad | Bad | Yes | No |
| 90-120 | 105 | 0.92 | Pick up okay | Bad | Bad | Yes | No |
| >120 | 120 | 2.12 | Second layer of latex cannot be coated evenly on the 1$^{st}$ layer | Bad | Bad | Yes | No |

TABLE 9C

| Propose Pre-Condition 3 Surface Temp (° C.) | Pre-Condition 3 | | Surface Temp | | | | |
|---|---|---|---|---|---|---|---|
| | Surface Temp before 3$^{nd}$ Latex Dip | Water Content (%) | Observation on surface after 3$^{nd}$ Dip Layer | Latex Pick Up | Latex flow mark | Thin/ Weak Spot | Rubber Lumps or Shrink-age |
| <25 | 23 | 61.62 | Pick up okay | Good | Good | No | No |
| 25-30 | 28 | 66.57 | Pick up okay | Good | Good | No | No |
| 30-35 | 33 | 65.20 | Pick up okay | Good | Good | No | No |
| 35-55 | 46 | 39.54 | Pick up okay | Good | Good | No | No |
| 55-65 | 70 | 0.46 | Third latex layer cannot be coated on to the second layer | Bad | Bad | No | No |
| 65-75 | 74 | 4.31 | | Bad | Bad | No | No |
| 75-90 | 83 | 2.88 | | Bad | Bad | No | No |
| 90-120 | 104 | 0.62 | | Bad | Bad | No | No |
| >120 | 121 | 0.64 | | Bad | Bad | No | No |

TABLE 10

| Drying | Pre-Condition 2 | | Observations on 2$^{nd}$ dipped layer | | | | |
|---|---|---|---|---|---|---|---|
| Oven Time (sec) | Surface Temp (° C.) | Water Content (%) | Latex Pick Up | Latex Flow Mark | Rubber Lump Formation | Thin/Weak Spot | Shrink-age |
| 10 | 49 | 74.84 | Good | No | No | No | No |
| 20 | 54 | 66.76 | Good | No | No | No | No |
| 30 | 55 | 60.01 | Good | No | No | No | No |
| 40 | 56 | 67.36 | Good | No | No | No | No |
| 50 | 55 | 72.39 | Good | No | No | No | No |
| 60 | 55 | 62.65 | Good | No | No | No | No |
| 70 | 55 | 69.36 | Good | No | No | No | No |
| 80 | 56 | 54.47 | Good | No | No | No | No |
| 110 | 58 | 52.43 | Good | No | No | No | No |
| 120 | 57 | 35.20 | Good | No | No | No | No |
| 130 | 61 | 24.45 | Good | Yes | No | No | No |
| 140 | 50 | 20.51 | No | Yes | No | No | No |
| 170 | 53 | 5.56 | No | Yes | No | No | No |
| 200 | 54 | 2.30 | No | Yes | No | No | No |
| 230 | 80 | 9.27 | No | Yes | No | No | No |
| 260 | 85 | 5.08 | No | Yes | No | No | No |
| 290 | 88 | 7.69 | No | Yes | No | No | No |
| 320 | 116 | 2.03 | No | Yes | No | No | No |
| 350 | 137 | 3.56 | No | Yes | No | No | No |

Testing Techniques

For all of the Examples, the following testing techniques were used.

General Testing Procedures

The testing procedures were conducted in accordance with ASTM D 6319-00 (Reapproved 2005), based on a 100 sample test size. This ASTM standard is available from ASTM International, and details the standard specifications and testing standards used for testing nitrile rubber examination gloves for medical applications. These tests can be applied similarly to non-glove multilayer films.

Barrier Defects

The barrier defects test for detecting holes was conducted in accordance with ASTM D 5151-06, which is incorporated within ASTM D 6319-00.

This test involves pouring a minimum of 1000 cm$^3$ of water having a room temperature of 15° C. to 30° C. into the top of a mandral to which the glove is affixed. The glove is then visually assessed for immediate water leakage and water leakage after 2 minutes. The extent of water leakage by a sample of 100 gloves was rated as follows:
1=Excellent: <1/100
2=Good: 2/100
3=Average: 3/100
4=Poor: 4/100
5=Very Poor: 5/100

Water Content

The water content of any film on a mould, which may be in the shape of a glove, is determined by the following method:
(i) Weigh the mould together with wet coated film (pre-condition film) and record the weight $Y_1$.
(ii) Dry (i) in an oven for 60 minutes at 120° C.
(iii) Place (ii) in a desiccator for 10 minutes for cooling.
(iv) Weigh (iii) and record the weight, $Y_2$ (dry film and mould).
(v) Calculate water content as $((Y_1-Y_2)/(Y_1-Y_0))\times 100\%$, where $Y_0$ is the uncoated mould net weight.

Stickiness of Gloves

Stickiness of gloves was assessed on a 100 glove sample size. The gloves were assessed by persons who wear elastomeric gloves as part of their work and the level of stickiness of batches of 20 gloves at a time was assessed, using the following rating system:
1=not sticky ("none")
2=less sticky ("minimal")
3=sticky ("sticky")
4=very sticky ("very")
5=very high stickiness ("high")

The average of the 5×20 glove batches was assessed to the closest round figure to give the stickiness level for the 100 glove sample size.

Latex Pick-Up

Latex pick-up refers to the pick-up or wetting of the composition for forming an elastomeric film on the mould, or any outer coating or layer on the mould. This is determined by visual inspection as being good (marked "good") or bad/absent ("poor"/"no").

Latex Flow Mark

Latex flow mark refers to the appearance of a flow mark where the composition appears to flow off the mould, or off the composition that has been coated or deposited prior to the subject coating. Causes of a flow mark can include a poor gel strength of the composition during dipping whereby the composition takes a longer time to deposit on the mould or previously deposited layer(s), poor pick-up or poor adhesion. This is assessed by visual inspection as being present (recorded as "yes", or "bad" or "moderate" to indicate degree) or not present (recorded as "no" or "good").

Evenness of Coating

Whether the coating is even is assessed visually, and recorded as being "even" or not even ("not").

Adhesion Between Layers of Elastomeric Film

Adhesion between layers is assessed by visual inspection during the process of dipping—that is, at the point at which the mould is withdrawn from the composition, or through assessment of the final product.

Rubber Lump Formation

Rubber lump formation refers to the formation of lumps of the composition for forming the elastomeric film on the mould, or a rough/lumpy surface of the composition on the mould. This can be assessed at the point when the mould is withdrawn from the composition, or in the final product. This is assessed by visual inspection as being present (recorded as "yes") or not present (recorded as "no").

Thin or Weak Spots

The presence or absence of thin or weak spots is tested by inflating the final product with air, and visually inspecting the product for thin or weak spots. Thin or weak spots are recorded as being present ("yes") or absent ("no").

Shrinkage.

A small level of shrinkage is permitted in the products, and arises as a result of the evaporation of moisture from the layers of composition for forming the elastomeric film. For a glove product of 27 cm in length (at the point in time when the mould is withdrawn from the composition for forming the last layer), there is normally shrinkage of about 0.5 cm in length after a few seconds (less than 10 seconds) from the point of withdrawal from the composition but before drying. In the case of a glove product, shrinkage of four times this level, or greater than 2 cm in a length of 27 cm, is considered to be an unacceptable level of shrinkage, and is recorded in shrinkage testing tables as being present ("yes"). If the level of shrinkage is 1 cm or less, this is recorded as being not present ("no").

Durability Testing.

The following test steps were taken to determine durability of gloves in a range of temperature and humidity conditions. The gloves were worn by persons involved in a range of duties, including at least the following three duties: (i) office work, (ii) packaging of products into boxes and (iii) laboratory/quality control/R&D work.
1. Condition gloves for 30 minutes in desiccator.
2. Provide gloves to at least 3 testers involved in the three duties—office work, packaging and laboratory work.
3. Record the time taken for the glove to tear when used by that tester.
4. Each tester tests 5 samples of gloves and records the time to tearing for each sample.

For the 15 trial results, the average time before tearing of the glove samples was determined. The durability was then classified as follows:
1 hours or less—poor durability ("poor" in table 6)
>1 hours to 3 hours—acceptable durability ("OK")
>3 hours—good durability ("good")

the invention claimed is:

1. A method for producing multi-layered elastomeric film or article, the method comprising:
(a) dipping a mould into a dipping tank comprising a coagulant containing multivalent ions in solution to produce a coagulant dipped mould,
(b) drying or partially drying the coagulant-dipped mould,
(c) dipping the coagulant-dipped mould into a dipping tank comprising a first composition for producing an elastomeric film having a total solids content of between 5%-40% to produce a layer of elastomeric film composition on the mould,
(d) partially drying the layer of elastomeric film composition on the mould to reduce a total water content of the elastomeric film composition to a level of not less than 22% and to raise the elastomeric film surface temperature to a maximum temperature of between 25° C. and 85° C.,
(e) dipping the mould coated with the partially dried layer of elastomeric film composition into a second composition for producing an elastomeric film having a total solids content of between 5%-40% to produce a further layer of elastomeric film composition on the mould, and
(f) drying and curing the layers of elastomeric film composition on the mould.

2. The method of claim 1, wherein the partial drying step (d) is controlled to reduce the water content to a level below 90%, but not less than 22%.

3. The method of claim 2, wherein the partial drying step (d) is controlled to reduce the water content to a level below 80% but not less than 25%.

4. The method of claim 3, wherein the partial drying step (d) is controlled to reduce the water content to a level below 77% but not less than 30%.

5. The method of claim 1, wherein the partial drying step (d) achieves a film surface temperature of between 30° C. and 80° C.

6. The method of claim 1, wherein the partial drying step (d) achieves a film surface temperature of between 40° C. and 80° C.

7. The method of claim 1, wherein the partial drying step (d) comprises subjecting the dipped mould to drying conditions at a temperature above ambient.

8. The method of claim 7 wherein the partial drying step (d) comprises applying drying radiation to the dipped mould.

9. The method of claim 1, wherein the mould is subjected to heating prior to dipping step (c).

10. The method of claim 9, wherein the heating step comprises heating to raise the surface temperature to a temperature in the range of 25° C. to 85° C.

11. The method of claim 1, wherein the mould is heated prior to dipping into the coagulant.

12. The method of claim 11, wherein the mould is heated to a surface temperature in the range of 30° C. to 70° C.

13. The method of claim 1, wherein the a dwell time of the mould in the dipping tank in step (c) is between 1.0 to 10.0 seconds.

14. The method of claim 1, wherein the film or article has between 2 to 15 layers.

15. The method of claim 1, wherein, between steps (d) and (e), a partial drying step and a further dipping step are each performed at least once, said partial drying step comprising drying of the elastomeric film composition on the mould to reduce the total water content of the elastomeric film composition to a level of not less than 22%, and said further dipping step comprising dipping the mould coated with the partially dried layer of elastomeric film composition into a composition for producing an elastomeric film having a total solids content of between 5% -40% to produce a further layer of elastomeric film composition on the mould.

16. The method of claim 1, wherein the first and second composition for producing an elastomeric film comprises an elastomer-forming polymer and a cross-linking agent.

17. The method of claim 1, wherein the mould is a glove-shaped mould, and the elastomeric article is a glove.

18. The method of claim 1, wherein the first composition for producing an elastomeric film is a synthetic elastomeric composition.

19. The method of claim 1, wherein dipping step (c) involves dipping a mould into a first composition for producing an elastomeric film comprising an elastomer-forming polymer and having a total solids content of between 5% and 40%; and the further dipping step (e) involves dipping the mould coated with the partially dried layer of elastomeric film composition into a second composition for producing an elastomeric film comprising an elastomer-forming polymer, wherein the second composition has a total solids content of between 5% and 40%, to produce a further layer of elastomeric film composition on the mould, and wherein the identity of the elastomer-forming polymer in the second composition is the same as the elastomer-forming polymer in the first composition.

20. The method of claim 1, wherein the coagulant is selected from the group consisting of calcium halide, calcium nitrate, calcium acetate, calcium sulphate, magnesium halide, magnesium nitrate, magnesium acetate, magnesium sulphate, barium halide, barium nitrate, barium acetate, barium sulphate, zinc halide, zinc nitrate, zinc acetate, zinc sulphate, aluminium halide, aluminium nitrate, aluminium acetate and aluminium sulphate.

21. The method of claim 1, wherein a concentration of coagulant in solution is between 1 and 20% by weight.

22. The method of claim 1, wherein a concentration of coagulant in solution is between 1.0 and 15% by weight.

23. The method of claim 1, wherein a dwell time of the mould in the coagulant in step (a) is between 1 and 30 seconds.

24. The method of claim 11, wherein the mould is heated to a surface temperature in the range of 25° C. to 85° C.

25. The method of claim 1, wherein a dwell time of the mould in the dipping tank in step (c) is between 1.0 to 30 seconds.

26. The method of claim 1, wherein the total solids content of the first composition for producing an elastomeric film in step (c) is between 5 and 20% by weight.

27. The method of claim 26, wherein the partial drying step (d) is controlled to reduce the water content to a level below 77% but not less than 30%.

28. The method of claim 1, wherein the multilayered elastomeric film or article is a glove, the method comprising:
  measuring a mass of a sample glove product at a point of completion of the partial drying step (d),
  driving off a remaining moisture in the sample glove product to obtain a dry mass, and
  determining from the mass of the sample glove at the completion of the partial drying step and the dry mass the water content of the sample glove product following the partial drying step.

29. The method of claim 28, comprising controlling the partial drying step to maintain the total water content within the precondition range for the elastomeric film composition following partial drying, based on the sample glove product results.

30. A method for producing a plurality of multi-layered elastomeric gloves, the method comprising:
  (a) dipping a glove-shaped mould into a coagulant containing multivalent ions in solution, to produce a coagulant dipped mould,
  (b) dipping the coagulant-dipped mould into a first composition for producing an elastomeric film having a total solids content of between 5% to 40% to produce a layer of elastomeric film composition on the mould,
  (c) partially drying the layer of elastomeric film composition on the mould to reduce the total water content of the elastomeric film composition to a level of not less than 22%,
  measuring a mass of a sample glove product at a point of completion of the partial drying step (c),
  driving off a remaining moisture in the sample glove product to obtain a dry mass, and
  determining from the mass of the sample glove at the completion of the partial drying step and the dry mass the water content of the sample glove product following the partial drying step,
  (d) dipping the mould coated with the partially dried layer of elastomeric film composition into a second composition for producing an elastomeric film having a total solids content of between 5% to 40% to produce a further layer of elastomeric film composition on the mould, and
  (e) drying and curing the layers of elastomeric film composition on the mould.

31. The method of claim 30, comprising controlling the partial drying step (c) to maintain the total water content within a level of not less than 22% for the elastomeric film composition following partial drying, based on the sample glove product results.

32. The method of claim 17, wherein the glove has a thickness of between 0.01-0.3 mm.

33. The method of claim 30, wherein the gloves have a thickness of between 0.01-0.3 mm.

* * * * *